US012718790B2

(12) United States Patent
Eronen et al.

(10) Patent No.: US 12,718,790 B2
(45) Date of Patent: Aug. 25, 2026

(54) CONDITIONAL DISABLING OF A REVERBERATOR

(71) Applicant: Nokia Technologies Oy, Espoo (FI)

(72) Inventors: Antti Johannes Eronen, Tampere (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 68 days.

(21) Appl. No.: 18/726,159

(22) PCT Filed: Jan. 2, 2023

(86) PCT No.: PCT/FI2023/050001

§ 371 (c)(1),
(2) Date: Jul. 2, 2024

(87) PCT Pub. No.: WO2023/131744

PCT Pub. Date: Jul. 13, 2023

(65) Prior Publication Data

US 2025/0069584 A1 Feb. 27, 2025

(30) Foreign Application Priority Data

Jan. 5, 2022 (GB) ...................................... 2200043

(51) Int. Cl.
*G10K 15/08* (2006.01)
*H04S 7/00* (2006.01)

(52) U.S. Cl.
CPC .............. *G10K 15/08* (2013.01); *H04S 7/303* (2013.01); *H04S 7/305* (2013.01)

(58) Field of Classification Search
CPC ...... H04S 2420/01; H04S 7/305; H04S 7/302; G06F 3/011; G10K 15/08
See application file for complete search history.

(56) References Cited

U.S. PATENT DOCUMENTS

| | | | | |
|---|---|---|---|---|
| 7,099,482 | B1 | 8/2006 | Jot et al. | 381/61 |
| 2019/0373395 | A1 | 12/2019 | Sarkar | |

OTHER PUBLICATIONS

Schissler, C. et al., "Interactive multi-source sound propagation and auralization for dynamic scenes," Simulation and Auralization of Concert Halls/Opera Houses: Paper ISMRA2016-70, The International Symposium on Musical and Room Acoustics, Sep. 11-13, 2016, La Plata, Buenos Aires, Argentina.
Creative Labs, "EAX 4.0 Introduction," EAX 4.0 manuals, 2003 Creative Technology, Ltd., Nov. 18, 2023.

(Continued)

*Primary Examiner* — Kile O Blair
(74) *Attorney, Agent, or Firm* — McCarter & English LLP; Benjamin A. Ailes

(57) ABSTRACT

An apparatus for assisting spatial rendering in at least two acoustic environments, the apparatus including circuitry configured to: obtain information associated with at least a number of reverberators; determine, based on the information, a set of reverberators from the number of reverberators, the set of reverberators configured to be initialized; generate at least one configuration parameter for at least one of the set of reverberators; initialize the set of reverberators based on the at least one configuration parameter; obtain at least one audio signal; and process the at least one audio signal with the initialized set of reverberators to generate late reverberation during rendering of the processed at least one audio signal.

20 Claims, 19 Drawing Sheets

(56) References Cited

OTHER PUBLICATIONS

Savioja, L. et al., "Creating Interactive Virtual Acoustic Environments," J. Audio Eng. Soc., vol. 47, No. 9, Sep. 1999.
"MPEG-I Immersive Audio Encoder Input Format," ISO/IEC JTC 1/SC 29/WG 6, N0054, MPEG Audio Coding Convenorship: US, Apr. 30, 2021.
Jot Jean-Marc et al: "Scene Description Model and Rendering Engine for Interactive Virtual Acoustics", AES Convention 120; May 2006, AES, 60 East 42nd Street, Room 2520 New York 10165-2520, USA, May 1, 2006 (May 1, 2006), XP040507554.
Creative Technology Ltd: "EAX 4.0—Programmer's Guide", Nov. 21, 2003 (Nov. 21, 2003), pp. 1-113, XP093332611.
Jot Jean-Marc et al: "Rendering Spatial Sound for Interoperable Experiences in the Audio Metaverse", 2021 Immersive and 3D Audio: From Architecture to Automotive (I3DA), IEEE, Sep. 8, 2021 (Sep. 8, 2021), pp. 1-15, XP034028733.
Kajastila Raine et al: "A Distributed Real-Time Virtual Acoustic Rendering System for Dynamic Geometries", AES Convention 122; May 2007, AES, 60 East 42nd Street, Room 2520 New York 10165-2520, USA, May 1, 2007 (May 1, 2007), XP040508232.

CONDITIONAL DISABLING OF A REVERBERATOR

CROSS REFERENCE TO RELATED APPLICATION

This patent application is a U.S. National Stage application of International Patent Application Number PCT/FI2023/050001 filed Jan. 2, 2023, which is hereby incorporated by reference in its entirety, and claims priority to GB 2200043.4 filed Jan. 5, 2022.

FIELD

The present application relates to apparatus and methods for spatial audio reproduction and the conditional disabling of reverberators, but not exclusively for spatial audio reproduction and the conditional disabling of reverberators in augmented reality and/or virtual reality apparatus.

BACKGROUND

Reverberation refers to the persistence of sound in a space after the actual sound source has stopped. Different spaces are characterized by different reverberation characteristics. For conveying spatial impression of an environment, reproducing reverberation perceptually accurately is important. Room acoustics are often modelled with individually synthesized early reflection portion and a statistical model for the diffuse late reverberation. FIG. 1 depicts an example of a synthesized room impulse response where the direct sound 101 is followed by discrete early reflections 103 which have a direction of arrival (DOA) and diffuse late reverberation 105 which can be synthesized without any specific direction of arrival. The delay d1(*t*) 102 in FIG. 1 can be seen to denote the direct sound arrival delay from the source to the listener and the delay d2(*t*) 104 can denote the delay from the source to the listener for one of the early reflections (in this case the first arriving reflection).

One method of reproducing reverberation is to utilize a set of N loudspeakers (or virtual loudspeakers reproduced binaurally using a set of head-related transfer functions (HRTF)). The loudspeakers are positioned around the listener somewhat evenly. Mutually incoherent reverberant signals are reproduced from these loudspeakers, producing a perception of surrounding diffuse reverberation.

The reverberation produced by the different loudspeakers has to be mutually incoherent. In a simple case the reverberations can be produced using the different channels of the same reverberator, where the output channels are uncorrelated but otherwise share the same acoustic characteristics such as RT60 time and level (specifically, the diffuse-to-direct ratio or reverberant-to-direct ratio). Such uncorrelated outputs sharing the same acoustic characteristics can be obtained, for example, from the output taps of a Feedback-Delay-Network (FDN) reverberator with suitable tuning of the delay line lengths, or from a reverberator based on using decaying uncorrelated noise sequences by using a different uncorrelated noise sequence in each channel. In this case, the different reverberant signals effectively have the same features, and the reverberation is typically perceived to be similar to all directions.

Reverberation spectrum or level can be controlled using the diffuse-to-direct ratio (DDR), which describes the ratio of the energy (or level) of reverberant sound energy to the direct sound energy (or the total emitted energy of a sound source).

SUMMARY

There is provided according to a first aspect an apparatus for assisting spatial rendering in at least two acoustic environments, the apparatus comprising means configured to: obtain information associated with at least a number of reverberators; determine, based on the information, a set of reverberators from the number of reverberators, the set of reverberators configured to be initialized; generate at least one configuration parameter for at least one of the set of reverberators; initialize the set of reverberators based on the at least one configuration parameter; obtain at least one audio signal; and process the at least one audio signal with the initialized set of reverberators to generate late reverberation during rendering of the processed at least one audio signal.

The means configured to obtain information associated with at least a number of reverberators may be configured to determine information at least partly based on a determination of an enclosure for at least one acoustic environment, wherein the at least one acoustic environment comprises at least one enclosure with a higher priority than a further acoustic environment without an enclosure.

The means configured to determine, based on the information, a set of reverberators from the number of reverberators, the set of reverberators configured to be initialized may be configured to compare the number of reverberators to a threshold number and select the set based on the threshold value, based on the set of reverberators with the highest priority.

The means configured to obtain the information may be configured to obtain information is at least partly based on the position of a user within an acoustic environment, with the reverberator corresponding to the acoustic environment enclosing the user receiving the highest priority and further reverberators associated with acoustic environments immediately connected to the enclosing acoustic environment receiving second highest priority.

The means configured to determine, based on the information, a set of reverberators from the number of reverberators may be configured to select in run-time, based on the position of the user, the set of reverberators from the number of reverberators.

The means configured to determine, based on the information, a set of reverberators from the number of reverberators may be configured to associate a lower priority to a reverberator associated with an acoustic environment with a low reverberation level than a reverberator associated with an acoustic environment with a higher reverberation level.

The means configured to determine, based on the information, a set of reverberators from the number of reverberators may be configured to assign information based on the distance of a listener to an acoustic environment, with a reverberator associated with an acoustic environment having a larger distance to the listener having a smaller priority than a reverberator associated with an acoustic environment having a smaller distance to the listener.

The means configured to obtain the information may be configured to receive from at least one further apparatus a bitstream comprising the information, wherein the information comprises content creator preferences.

The means configured to obtain the information may be configured to obtain information from a bitstream, wherein the information may comprise an importance of at least one criteria when prioritizing the reverberators, wherein the at least one criteria may comprise: an enclosure existence; a threshold number of reverberators; a position of a listener in an acoustic enclosure; a reverberation level; and a distance of the listener from an acoustic environment.

The means configured to generate at least one configuration parameter for at least one of the set of reverberators may be configured to generate at least one of: generate configuration parameter values for configuration parameters common for the set of reverberators, wherein the configuration parameter values can be the same or differ for each configuration parameter between reverberators of the set of reverberators; and generate configuration parameter values for different configuration parameters for the set of reverberators; and generate configuration parameter values for indicating whether a member of the set of reverberators from the number of reverberators is to be initialized at this point in time.

The set of reverberators may be a sub-set of reverberators smaller than the number of reverberators.

According to a second aspect there is provided a method for an apparatus for assisting spatial rendering in at least two acoustic environments, the method comprising: obtaining information associated with at least a number of reverberators; determining, based on the information, a set of reverberators from the number of reverberators, the set of reverberators configured to be initialized; generating at least one configuration parameter for at least one of the set of reverberators; initializing the set of reverberators based on the at least one configuration parameter; obtaining at least one audio signal; and processing the at least one audio signal with the initialized set of reverberators to generate late reverberation during rendering of the processed at least one audio signal.

Obtaining information associated with at least a number of reverberators may comprise determining information at least partly based on a determination of an enclosure for at least one acoustic environment, wherein the at least one acoustic environment may comprise at least one enclosure with a higher priority than a further acoustic environment without an enclosure.

Determining, based on the information, a set of reverberators from the number of reverberators, the set of reverberators configured to be initialized may comprise comparing the number of reverberators to a threshold number and select the set based on the threshold value, based on the set of reverberators with the highest priority.

Obtaining the information may comprise obtaining information at least partly based on the position of a user within an acoustic environment, with the reverberator corresponding to the acoustic environment enclosing the user receiving the highest priority and further reverberators associated with acoustic environments immediately connected to the enclosing acoustic environment receiving second highest priority.

Determining, based on the information, a set of reverberators from the number of reverberators may comprise selecting in run-time, based on the position of the user, the set of reverberators from the number of reverberators.

Determining, based on the information, a set of reverberators from the number of reverberators may comprise associating a lower priority to a reverberator associated with an acoustic environment with a low reverberation level than a reverberator associated with an acoustic environment with a higher reverberation level.

Determining, based on the information, a set of reverberators from the number of reverberators may comprise assigning information based on the distance of a listener to an acoustic environment, with a reverberator associated with an acoustic environment having a larger distance to the listener having a smaller priority than a reverberator associated with an acoustic environment having a smaller distance to the listener.

Obtaining the information may comprise receiving from at least one further apparatus a bitstream comprising the information, wherein the information may comprise content creator preferences.

Obtaining the information may comprise obtaining information from a bitstream, wherein the information may comprise an importance of at least one criteria when prioritizing the reverberators, wherein the at least one criteria may comprise: an enclosure existence; a threshold number of reverberators; a position of a listener in an acoustic enclosure; a reverberation level; and a distance of the listener from an acoustic environment.

Generating at least one configuration parameter for at least one of the set of reverberators may comprise generating at least one of: generating configuration parameter values for configuration parameters common for the set of reverberators, wherein the configuration parameter values can be the same or differ for each configuration parameter between reverberators of the set of reverberators; and generating configuration parameter values for different configuration parameters for the set of reverberators; and generating configuration parameter values for indicating whether a member of the set of reverberators from the number of reverberators is to be initialized at this point in time.

The set of reverberators may be a sub-set of reverberators smaller than the number of reverberators.

According to a third aspect there is provided an apparatus for assisting spatial rendering in at least two acoustic environments, the apparatus comprising at least one processor and at least one memory including a computer program code, the at least one memory and the computer program code configured to, with the at least one processor, cause the apparatus at least to: obtain information associated with at least a number of reverberators; determine, based on the information, a set of reverberators from the number of reverberators, the set of reverberators configured to be initialized; generate at least one configuration parameter for at least one of the set of reverberators; initialize the set of reverberators based on the at least one configuration parameter; obtain at least one audio signal; and process the at least one audio signal with the initialized set of reverberators to generate late reverberation during rendering of the processed at least one audio signal.

The apparatus caused to obtain information associated with at least a number of reverberators may be caused to determine information at least partly based on a determination of an enclosure for at least one acoustic environment, wherein the at least one acoustic environment comprises at least one enclosure with a higher priority than a further acoustic environment without an enclosure.

The apparatus caused to determine, based on the information, a set of reverberators from the number of reverberators, the set of reverberators configured to be initialized may be caused to compare the number of reverberators to a threshold number and select the set based on the threshold value, based on the set of reverberators with the highest priority.

The apparatus caused to obtain the information may be caused to obtain information is at least partly based on the position of a user within an acoustic environment, with the reverberator corresponding to the acoustic environment enclosing the user receiving the highest priority and further reverberators associated with acoustic environments immediately connected to the enclosing acoustic environment receiving second highest priority.

The apparatus caused to determine, based on the information, a set of reverberators from the number of reverberators may be caused to select in run-time, based on the position of the user, the set of reverberators from the number of reverberators.

The apparatus caused to determine, based on the information, a set of reverberators from the number of reverberators may be caused to associate a lower priority to a reverberator associated with an acoustic environment with a low reverberation level than a reverberator associated with an acoustic environment with a higher reverberation level.

The apparatus caused to determine, based on the information, a set of reverberators from the number of reverberators may be caused to assign information based on the distance of a listener to an acoustic environment, with a reverberator associated with an acoustic environment having a larger distance to the listener having a smaller priority than a reverberator associated with an acoustic environment having a smaller distance to the listener.

The apparatus caused to obtain the information may be caused to receive from at least one further apparatus a bitstream comprising the information, wherein the information comprises content creator preferences.

The apparatus caused to obtain the information may be caused to obtain information from a bitstream, wherein the information may comprise an importance of at least one criteria when prioritizing the reverberators, wherein the at least one criteria may comprise: an enclosure existence; a threshold number of reverberators; a position of a listener in an acoustic enclosure; a reverberation level; and a distance of the listener from an acoustic environment.

The apparatus caused to generate at least one configuration parameter for at least one of the set of reverberators may be caused to generate at least one of: generate configuration parameter values for configuration parameters common for the set of reverberators, wherein the configuration parameter values can be the same or differ for each configuration parameter between reverberators of the set of reverberators; and generate configuration parameter values for different configuration parameters for the set of reverberators; and generate configuration parameter values for indicating whether a member of the set of reverberators from the number of reverberators is to be initialized at this point in time.

The set of reverberators may be a sub-set of reverberators smaller than the number of reverberators.

According to a fourth aspect there is provided an apparatus comprising: obtaining circuitry configured to obtain information associated with at least a number of reverberators; determining circuitry configured to determine, based on the information, a set of reverberators from the number of reverberators, the set of reverberators configured to be initialized; generating circuitry configured to generate at least one configuration parameter for at least one of the set of reverberators; initializing circuitry configured to initialize the set of reverberators based on the at least one configuration parameter; obtaining circuitry configured to obtain at least one audio signal; and processing circuitry configured to process the at least one audio signal with the initialized set of reverberators to generate late reverberation during rendering of the processed at least one audio signal.

According to a fifth aspect there is provided a computer program comprising instructions [or a computer readable medium comprising program instructions] for causing an apparatus to perform at least the following: obtain information associated with at least a number of reverberators; determine, based on the information, a set of reverberators from the number of reverberators, the set of reverberators configured to be initialized; generate at least one configuration parameter for at least one of the set of reverberators; initialize the set of reverberators based on the at least one configuration parameter; obtain at least one audio signal; and process the at least one audio signal with the initialized set of reverberators to generate late reverberation during rendering of the processed at least one audio signal.

According to a sixth aspect there is provided a non-transitory computer readable medium comprising program instructions for causing an apparatus to perform at least the following: obtain information associated with at least a number of reverberators; determine, based on the information, a set of reverberators from the number of reverberators, the set of reverberators configured to be initialized; generate at least one configuration parameter for at least one of the set of reverberators; initialize the set of reverberators based on the at least one configuration parameter; obtain at least one audio signal; and process the at least one audio signal with the initialized set of reverberators to generate late reverberation during rendering of the processed at least one audio signal.

According to a seventh aspect there is provided an apparatus comprising: means for obtaining information associated with at least a number of reverberators; means for determining, based on the information, a set of reverberators from the number of reverberators, the set of reverberators configured to be initialized; means for generating at least one configuration parameter for at least one of the set of reverberators; means for initializing the set of reverberators based on the at least one configuration parameter; means for obtaining at least one audio signal; and means for processing the at least one audio signal with the initialized set of reverberators to generate late reverberation during rendering of the processed at least one audio signal.

According to an eighth aspect there is provided a computer readable medium comprising program instructions for causing an apparatus to perform at least the following: obtain information associated with at least a number of reverberators; determine, based on the information, a set of reverberators from the number of reverberators, the set of reverberators configured to be initialized; generate at least one configuration parameter for at least one of the set of reverberators; initialize the set of reverberators based on the at least one configuration parameter; obtain at least one audio signal; and process the at least one audio signal with the initialized set of reverberators to generate late reverberation during rendering of the processed at least one audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for parameterizing and rendering audio scenes with reverberation. Thus in some embodiments there is apparatus for rendering spatial audio in at least two acoustic environments or for controlling a reverberator in spatial audio rendering.

As discussed above reverberation can be rendered using, e.g., a Feedback-Delay-Network (FDN) reverberator with a suitable tuning of delay line lengths. An FDN allows to control the reverberation times (RT60) and the energies of different frequency bands individually. Thus, it can be used to render the reverberation based on the characteristics of the room or modelled space. The reverberation times and the energies of the different frequencies are affected by the frequency-dependent absorption characteristics of the room.

As described above the reverberation spectrum or level can be controlled using a diffuse-to-direct ratio, which describes the ratio of the energy (or level) of reverberant sound energy to the direct sound energy (or the total emitted energy of a sound source). In ISO/IEC JTC1/SC29/WG6 N00054 MPEG-I Immersive Audio Encoder Input Format, the input to the encoder is provided as DDR value which indicates the ratio of the diffuse (reverberant) sound energy to the total emitted energy of a sound source. Another well-known measure is the RDR which refers to reverberant-to-direct ratio and which can be measured from an impulse response. The relation between these two, described in ISO/IEC JTC1/SC29/WG6 N0083 MPEG-I Immersive Audio CfP Supplemental Information, Recommendations and Clarifications, Version 1, is that $$10*\log 10(DDR)=10*\log 10(RDR)-41 \text{ dB}.$$

Figure 1:
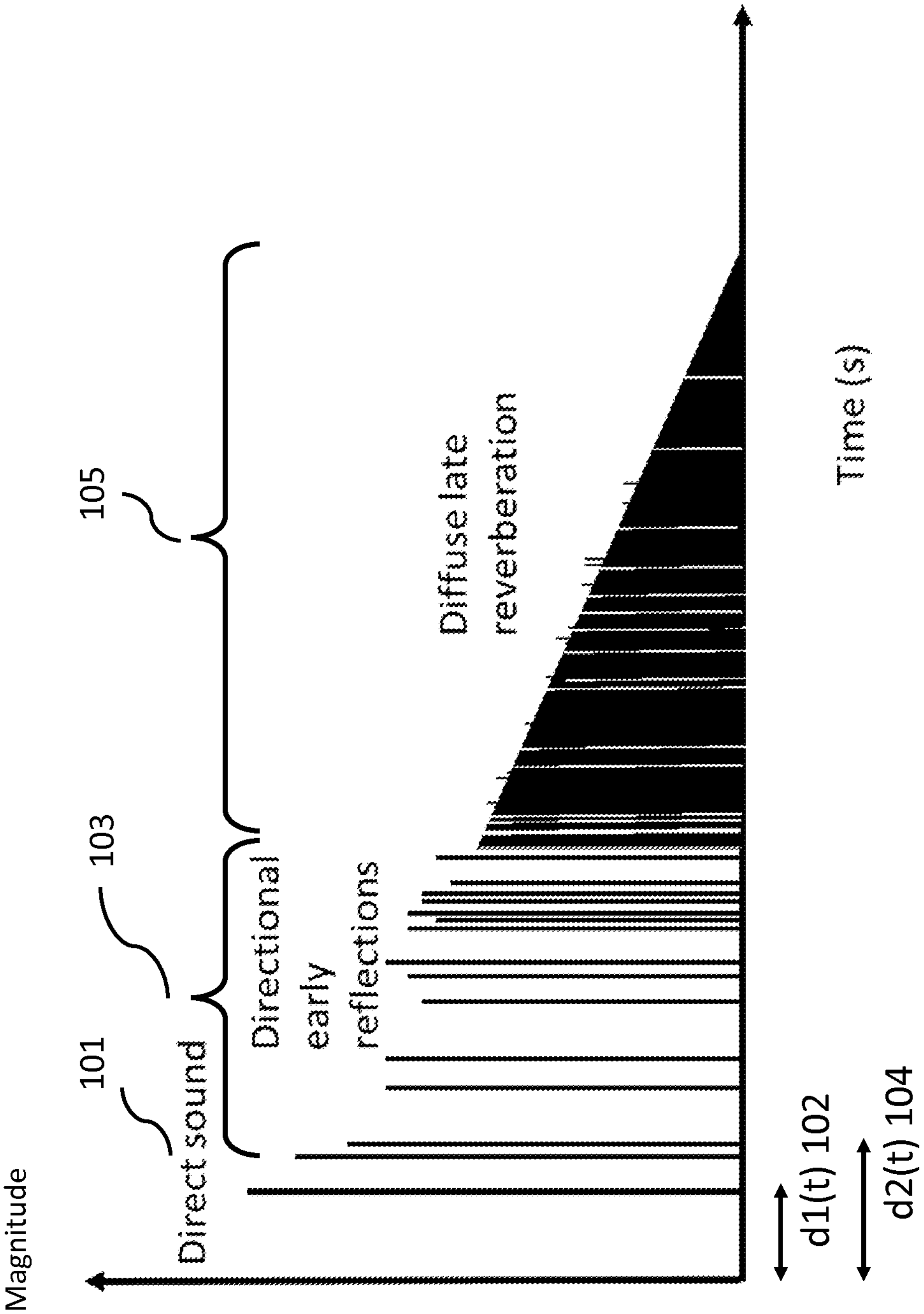
FIG. 1 shows a model of room acoustics and the room impulse response.

Referring to FIG. 1, the RDR can be calculated by summing the squares of the sample values of the diffuse late reverberation portion 105 summing the squares of the sample values of the direct sound portion 101 calculating the ratio of these two sums to give the RDR.

The logarithmic RDR can be obtained as 10*log 10(RDR).

In a virtual environment for virtual reality (VR) or a real physical environment for augmented reality (AR) there can be several acoustic environments, each with their own reverberation parameters which can be different in different acoustic environments. This kind of environment can be rendered with multiple reverberators running in parallel, so that a reverberator instance is running in each acoustic environment. When the listener is moving in the environment, the current environment reverberation is rendered as an enveloping spatial sound surrounding the user, and the reverberation from nearby acoustic spaces is rendered as via so called acoustic portals. An acoustic portal reproduces the reverberation from the nearby acoustic environment as a spatially extended sound source.

Figure 2:
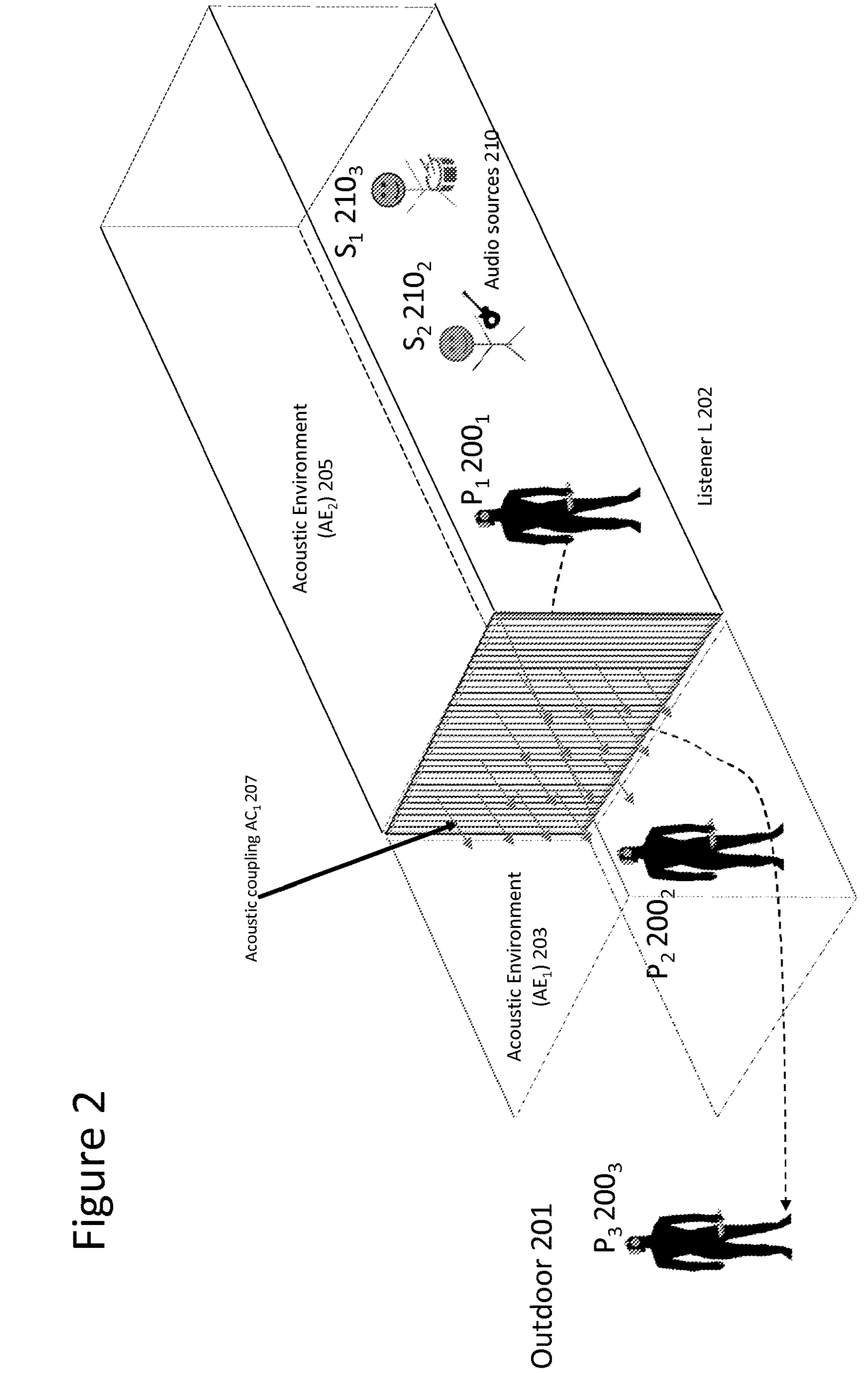
FIG. 2 shows an example environment within which embodiments can be implemented showing an audio scene with an audio portal or acoustic coupling.

An example of such an environment is shown in FIG. 2. In this example there is shown the audio scene comprising a first acoustic environment $AE_1$ 203, a second acoustic environment $AE_2$ 205 and outdoor 201. There is shown an acoustic coupling $AC_1$ 207 between the first acoustic environment $AE_1$ 203 and a second acoustic environment $AE_2$ 205.

In this example the sound or audio sources 210 are located within the second acoustic environment $AE_2$ 205. In this example the audio sources 210 comprise a first audio source, a drummer, $S_1$ $210_3$ and a second audio source, a guitarist, $S_2$ $210_2$. The Listener 202 is further shown moving through the audio scene and is shown in the first acoustic environment $AE_1$ 203 at position $P_1$ $200_1$, in the second acoustic environment $AE_2$ 205 at position $P_2$ $200_2$ and outdoor 201 at position $P_3$ $200_3$.

Several acoustic environments can be rendered with several digital reverberators running in parallel, each reproducing the reverberation according to the characteristics of an acoustic environment. The environments can furthermore provide input to each other via the 'portals'. However, running several reverberators is computationally intensive especially if there are several environments and thus reverberators, and even so if the reverberators are complex. For example, in some cases the apparatus may be configured to employ feedback delay network (FDN) reverberators with many delay lines (of the order of dozens) and complex attenuation filters such as filterbanks at third octave frequency resolution.

Although it could be possible to always disable the reverberators except the one associated with the environment where the user currently is, such a process would prevent rendering second order reverberation. That is, reverberating sound leaking from a neighbouring room into the current room via an acoustic portal. Therefore, there is a need to develop computationally efficient methods to rendering the reverberation of several acoustic spaces simultaneously.

Current approaches have described approaches where late reverb modeling from acoustic environment information can be implemented using Feedback-Delay-Network (FDN) and that it is possible to design a diffuse-to-total energy ratio (DDR) filter to adjust the late reverb level based on input DDR data.

Additionally it has been described methods and apparatus for fusion of virtual scene description in bitstream and listener space description for 6DoF rendering where there is late reverb modelling for immersive audio scenes where the acoustic environment is a combination of content creator specified virtual scene as well as listener-consumption-space influenced listening space parameters.

The concept as discussed in the embodiments in further detail herein relates to reproduction of late reverberation in 6DoF audio rendering systems where a method is proposed that enables computationally efficient rendering of a first number of reverberators each associated with an acoustic environment and reverberator parameters. This in some embodiments is achieved by obtaining priority information associated with the first number of reverberators. Then based on the priority information, determining which reverberators should be active. Furthermore based on the determining, activating reverberator processing for a subset of the reverberators, where the number of reverberators in the subset is less than the first number.

In some embodiments the apparatus and methods furthermore obtain reverberator parameters for the subset of reverberators, obtain at least one audio signal and render late reverberation using the subset of reverberators, initialized with the reverberator parameters, and using the at least one audio signal.

In some embodiments the priority information is at least partly based on the existence of an enclosure for the acoustic environments and with acoustic environments having an enclosure receiving a higher priority than acoustic environments without an enclosure.

In some embodiments, the determining is implemented by comparing the first number of reverberators to a threshold number and limiting the size of the subset to the threshold number and including the reverberators with the highest priority into the subset.

In some embodiments, the threshold number may depend on the computational complexity of the rendering operation. Consequently, the threshold number may be used to specify different profiles of the reverberation.

In some embodiments, the threshold number may specify the number of delay lines per reverb rendering in addition to the number of reverb renderings.

Furthermore in some embodiments, the priority information is at least partly based on the position of the user within the acoustic environments, with the reverberator corresponding to the acoustic environment enclosing the user receiving the highest priority and reverberators associated with acoustic environments immediately connected to the enclosing acoustic environment receiving second highest priority.

In some embodiments the priority information is at least partly based on the level of reverberation in an acoustic environment, with the reverberator associated with an acoustic environment with a low reverberation level receiving a lower priority than a reverberator associated with an acoustic environment with a higher reverberation level. In some embodiments where the content creator wishes to retain an active reverberator due to the scene demands (e.g., it may be feeding an important audio portal), such acoustic environment can be assigned high priority to override the low reverberation level based prioritization.

Additionally in some embodiments, the priority information is at least partly based on the distance of the listener to an acoustic environment, with a reverberator associated with an acoustic environment having a larger distance to the listener having a smaller priority than a reverberator associated with an acoustic environment having a smaller distance to the listener.

The priority information, in some embodiments, is at least partly based on bitstream priority information derived by an encoder apparatus based on, for example, content creator preferences, and provided in a bitstream element for the method.

In some embodiments, priority information provided in a bitstream element for the method contains importance of various criteria when prioritizing the reverberators: the existence of an enclosure, meeting a threshold number of reverberators, position of user in an acoustic enclosure, reverberation level, distance of the listener from an acoustic environment.

MPEG-I Audio Phase 2 currently being standardized at ISO/IEC JTC1/SC29/WG6 will normatively standardize the bitstream and the renderer processing. There will also be an encoder reference implementation, but it can be modified later on as long as the output bitstream follows the normative specification. This allows improving the codec quality also after the standard has been finalized with novel encoder implementations.

Figure 3:
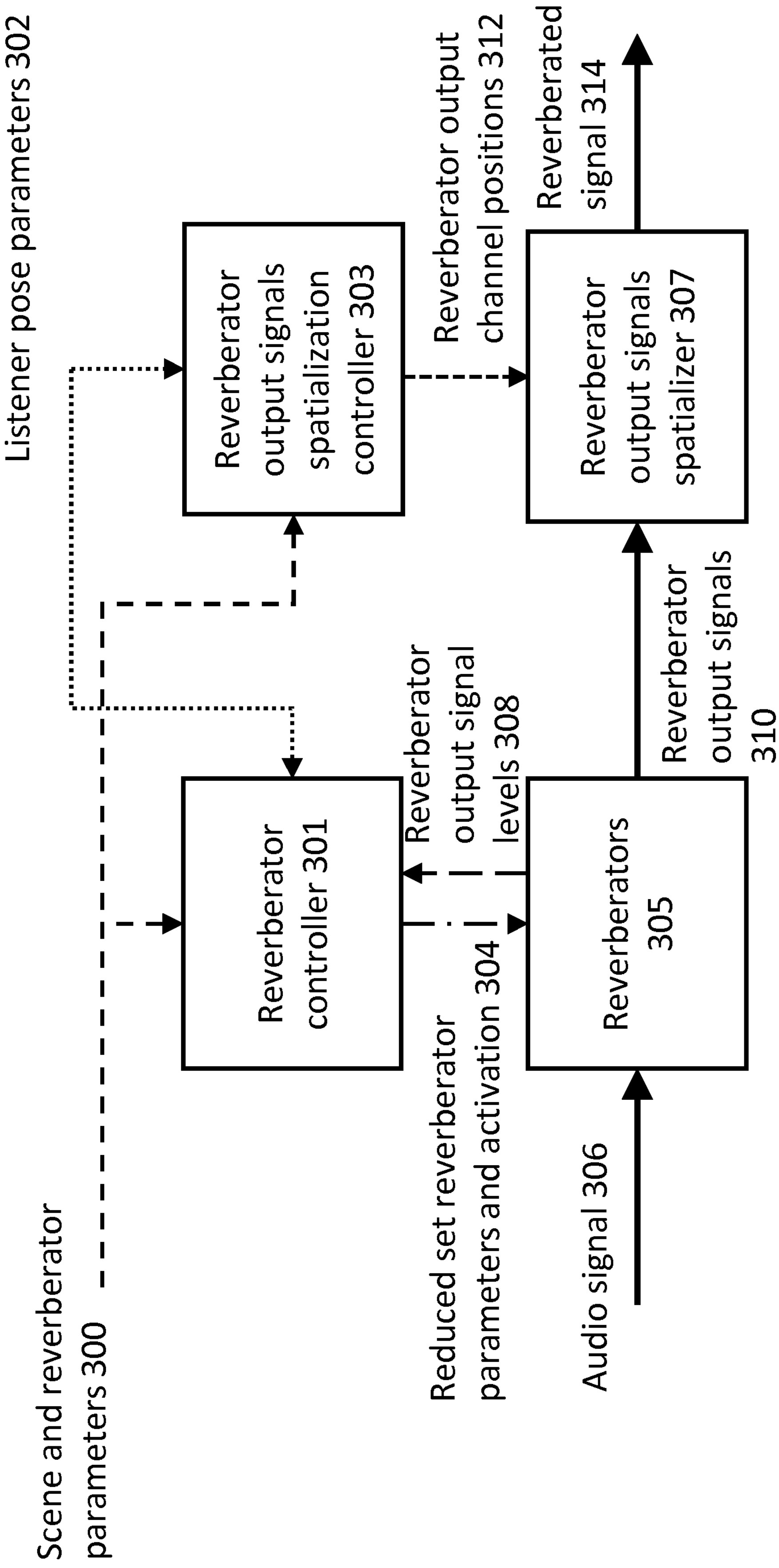
FIG. 3 shows schematically an example apparatus within which some embodiments may be implemented.

In some embodiments, the portions that could be implemented in different parts of the MPEG-I standard are as follows:

The normative bitstream shall contain the scene and reverberator parameters with priority information using the syntax described here;

The normative renderer shall decode the bitstream to obtain scene and reverberator parameters, determine the priority information for reverberators, initialize a subset of the reverberators for rendering using the reverberator parameters, determine activation information for the subset of reverberators, and render reverberated signal using the subset of reverberators;

With respect to FIG. 3 is shown an example system of apparatus suitable for implementing some embodiments.

The input to the system of apparatus is scene and reverberator parameters 300, listener pose parameters 302 and audio signal 306. The system of apparatus generates as an output, a reverberated signal 314 (e.g. binauralized with head-related-transfer-function (HRTF) filtering for reproduction to headphones, or panned with Vector-Base Amplitude Panning (VBAP) for reproduction to loudspeakers).

In some embodiments the apparatus comprises a reverberator controller 301. The reverberator controller 301 is configured to obtain or receive the scene and reverberator parameters 300. In some embodiments, the reverberator parameters are in the form of enclosing room geometry and parameters for the digital feedback delay network (FDN) reverberators. The scene and reverberator parameters in some embodiments also contain the positions of the enclosing room geometries (or Acoustic Environments) so that the apparatus or method can determine distances and orientations between the listener and each of the acoustic environments or between acoustic environments. Furthermore in some embodiments the scene and reverberator parameters 300 is configured to contain the positions and geometries of the portals such that sound can pass between acoustic environments.

The reverberator controller 301 is configured to pass the reverberator parameters from the input scene and reverberator parameters 300 to initialize the (FDN) reverberators 305 to reproduce reverberation according to the reverberator parameters 304. Each reverberator of the reverberators 305 is configured to reproduce the reverberation according to the characteristics of an acoustic environment, where the corresponding reverberator parameters are derived from.

In some embodiments, the reverberator parameters are derived by an encoder based on acoustic environment parameters and written into a bitstream, which the example embodiment shown in FIG. 3 receives.

In some embodiments the reverberator controller 301 is further configured to generate an activation signal which indicates which of several reverberators 305 should be active. This activation (or selection) can change over time. Note that equivalently to activation, one could generate deactivation (or deselection) signals from the reverberator controller 301. In order to produce the activation information, the reverberator controller is configured to utilize the scene parameters within the scene and reverberator parameters 300 and the listener pose parameters 302, which it can use to determine where the listener currently is in the virtual scene and their distance with regard to each of the enclosing room geometries associated with the reverberators whose parameters are carried in reverberator parameters.

In some embodiments the apparatus comprises reverberators 305. The reverberators 305 is configured to obtain reverberator parameters and activation 304 and also receive the audio signal $s_{in}(t)$ (where t is time) 306. In some embodiments the reverberators 305 are configured to reverberate the audio signal 306 based on the reverberator parameters and activation 304.

The details of the reverberation processing are presented in further detail later.

The reverberators 305 in some embodiments output the resulting reverberator output signals $S_{rev,r}(j, t)$ 310 (where j is the output audio channel index and r the reverberator index). There are several reverberators, each of which produce several output audio signals. These reverberator output signals 310 are input into a reverberator output signals spatializer 307.

In some embodiments the apparatus comprises a reverberator output signals spatializer 307. The reverberator output signals spatializer 307 is configured to obtain the reverberator output signals 310 and the reverberator output channel positions 312 and based on these produces an output signal suitable for reproduction via headphones or via loudspeakers.

Furthermore the apparatus comprises a reverberator output signals spatialization controller 303 configured to generate the reverberator output channel positions 312. The reverberator output channel positions 312 in some embodiments indicates cartesian coordinates which are to be used when rendering each of the signals in $s_{rev,r}(j, t)$. In some other embodiments other representations (or other co-ordinate system) such as polar coordinates can be used.

In some embodiments the reverberator output signals spatializer 307 is configured to render each reverberator output into a desired output format, such as binaural, and then sum the signals to produce the output reverberated signal 314. For binaural reproduction the reverberator output signals spatializer 307 can use HRTF filtering to render the reverberator output signals 310 in their desired positions indicated by the reverberator output channel positions 312.

This reverberation in the reverberated signals 314 is therefore based on the scene and reverberator parameters 300 as was desired and further considers listener pose parameters 302.

Figure 4:
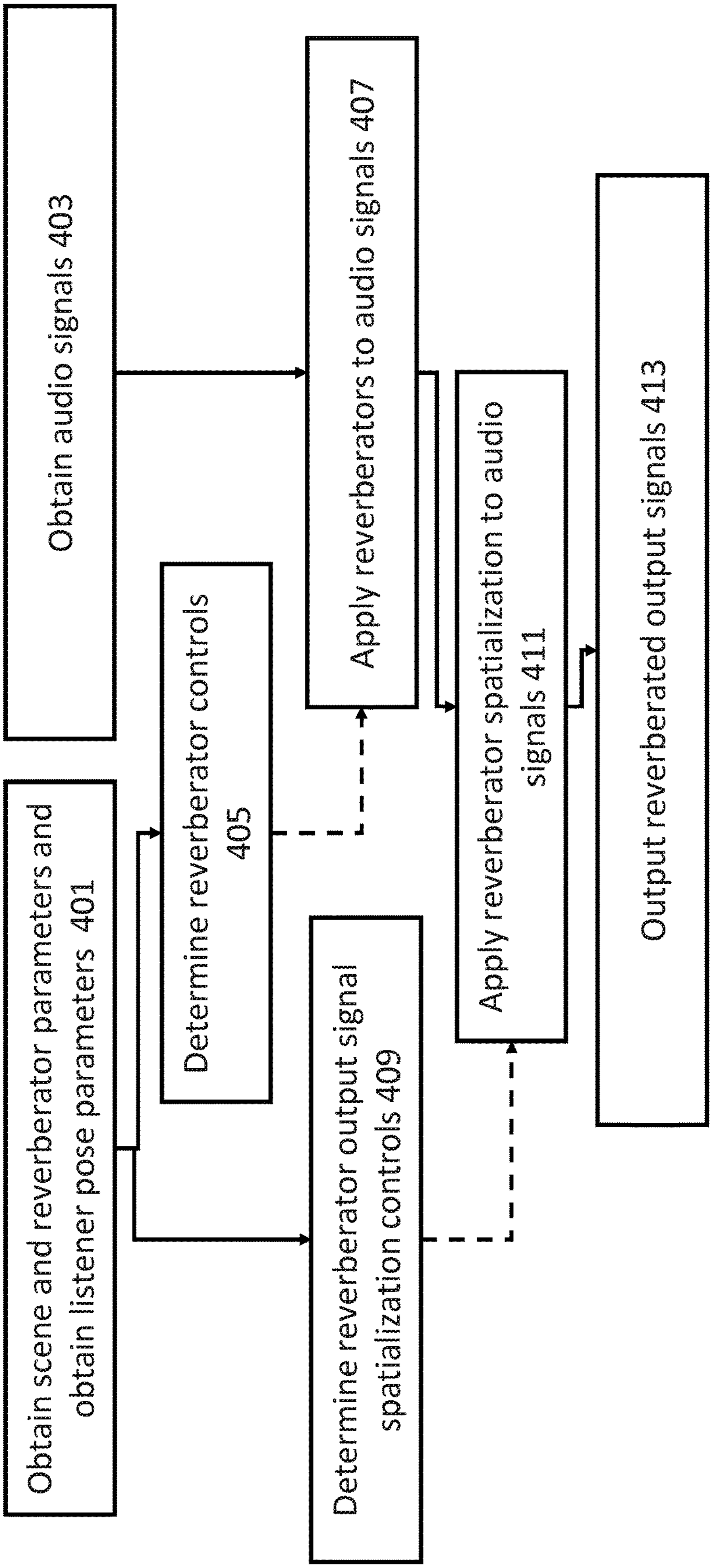
FIG. 4 shows a flow diagram of the operation of the example apparatus as shown in FIG. 3.

With respect to FIG. 4 is shown a flow diagram showing the operations of example apparatus shown in FIG. 3 according to some embodiments.

Thus, for example, the method may comprise obtaining scene and reverberator parameters and obtaining listener pose parameters as shown in FIG. 4 by step 401.

Furthermore the audio signals are obtained as shown in FIG. 4 by step 403.

Then the reverberator controls are determined based on the obtained scene and reverberator parameters and listener pose parameters as shown in FIG. 4 by step 405.

Then the reverberators controlled by the reverberator controls are applied to the audio signals as shown in FIG. 4 by step 407.

Furthermore the reverberator output signal spatialization controls are determined based on the obtaining scene and reverberator parameters and listener pose parameters as shown in FIG. 4 by step 409.

The reverberator spatialization based on the reverberator output signal spatialization controls can then be applied to the reverberated audio signals from the reverberators to generate output reverberated audio signals as shown in FIG. 4 by step 411.

Then the output reverberated audio signals are output as shown in FIG. 4 by step 413.

Figure 5:
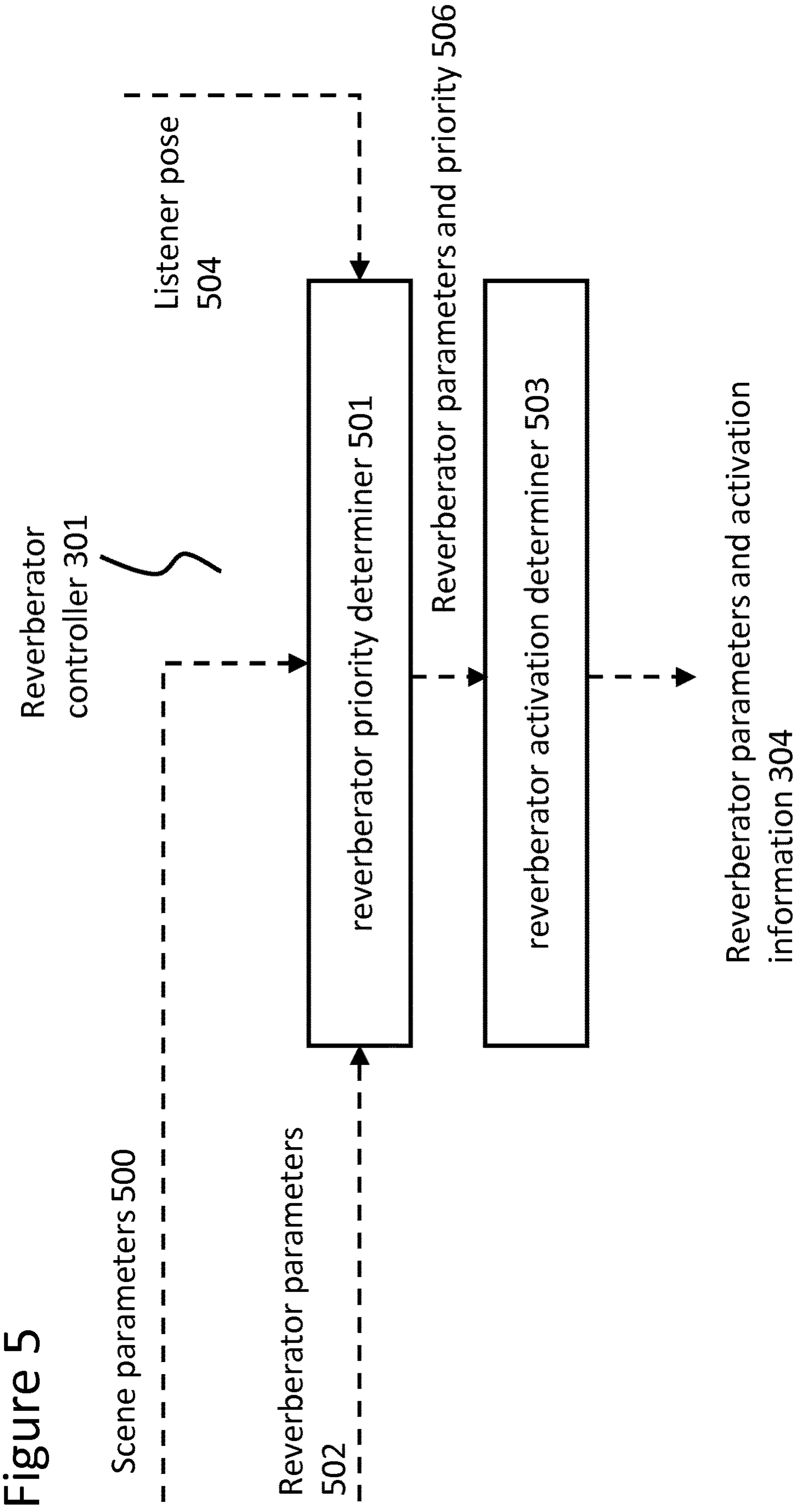
FIG. 5 shows schematically an example reverberator controller as shown in FIG. 3 according to some embodiments.

With respect to FIG. 5 there is shown in further detail an example reverberator controller 301. In some embodiments the reverberator controller 301 comprises a reverberator priority determiner 501. The reverberator priority determiner 501 is configured to obtain the scene parameters 500, the reverberator parameters 502 and the listener pose 504 and generate reverberator parameters and priority 506.

Furthermore the reverberator controller 301 comprises a reverberator activation determiner 503. The reverberator activation determiner 503 is configured to obtain the reverberator parameters and priority 506 and from this generate activation information for activating or selecting (some of) the reverberators in the reverberators 305. This can be implemented by generating reverberator parameters and activation information 304 and passing this to the reverberators to configure or initialize (some of) the reverberators.

Figure 6:
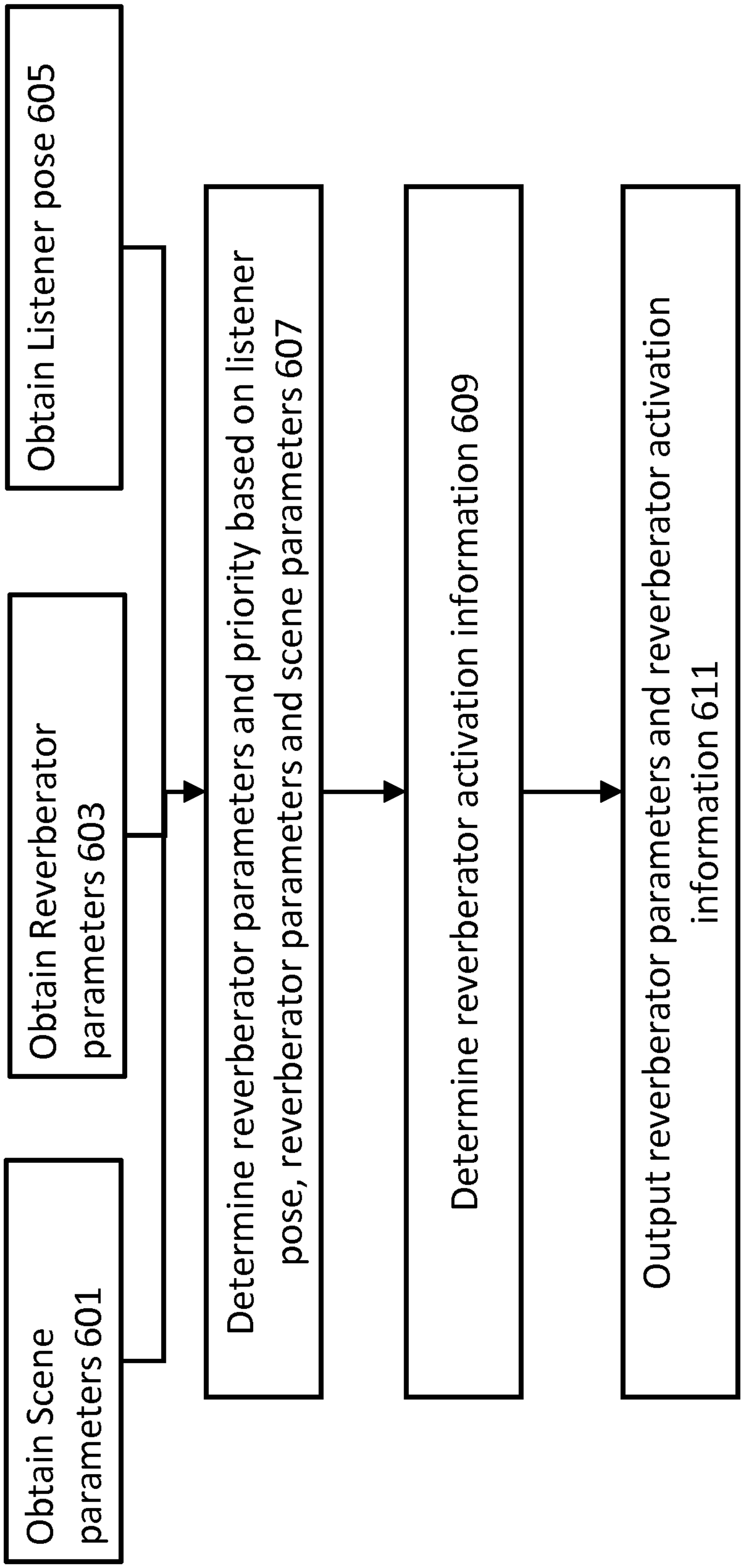
FIG. 6 shows a flow diagram of the operation of the example reverberator controller as shown in FIG. 5.

With respect to FIG. 6 is shown a flow diagram showing the operations of example a reverberator controller 301 shown in FIG. 5 according to some embodiments.

Thus in some embodiments there is obtained the scene parameters as shown in FIG. 6 by step 601.

Furthermore in some embodiments there is obtained the reverberator parameters as shown in FIG. 6 by step 603.

Additionally in some embodiments there is obtained listener pose information as shown in FIG. 6 by step 605.

Having obtained the inputs then the controller can determine reverberator parameters and priority based on the listener pose, reverberator parameters and scene parameters as shown in FIG. 6 by step 607.

Furthermore in some embodiments there is determined reverberator activation information based on the priority as shown in FIG. 6 by step 609.

Then the method comprises outputting reverberator parameters and reverberator activation information as shown in FIG. 6 by step 611.

Figure 7:
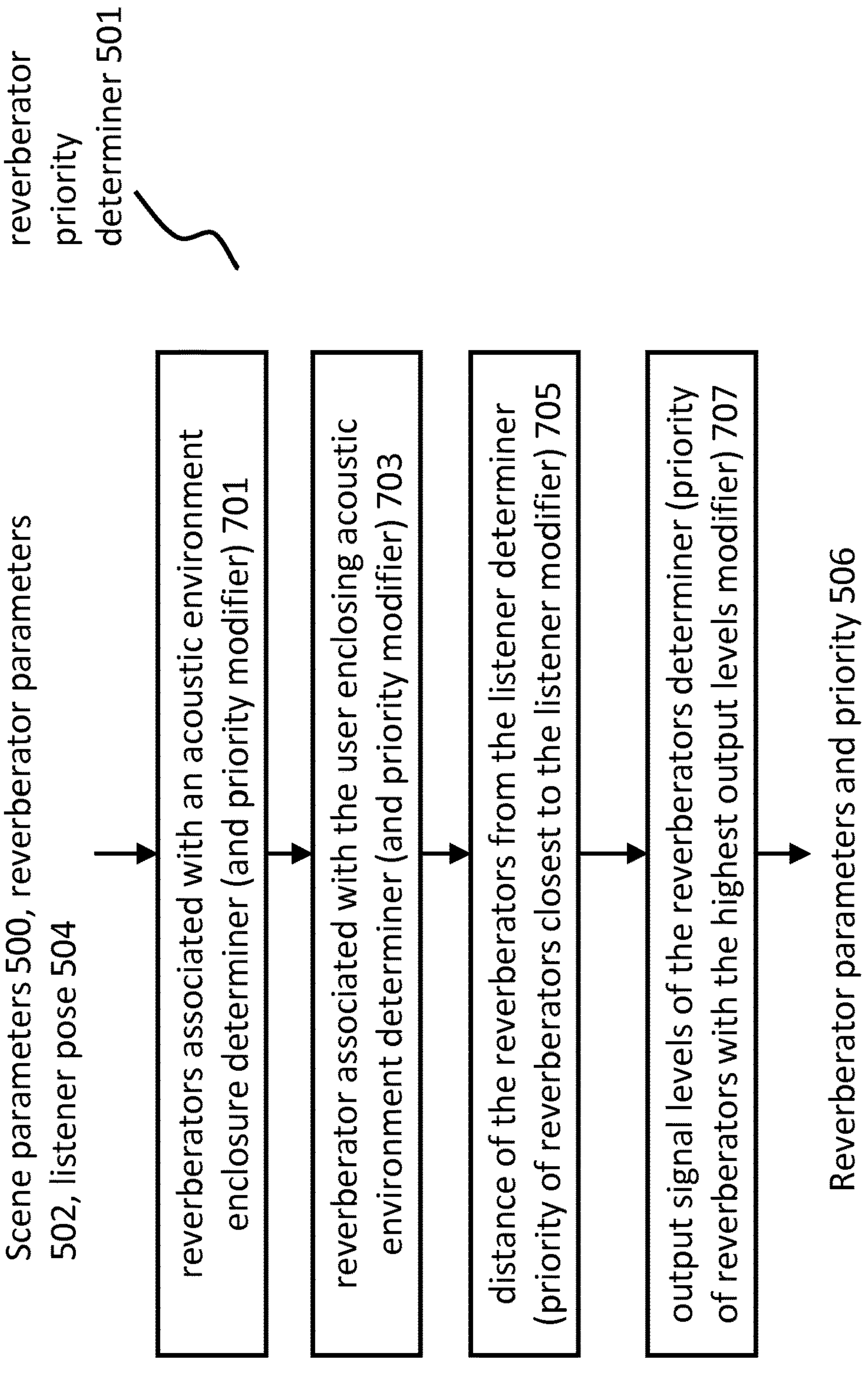
FIG. 7 shows schematically an example reverberator priority determiner as shown in FIG. 5 according to some embodiments.

FIG. 7 shows schematically in further detail the reverberator priority determiner 503 shown in FIG. 5. The reverberator priority is configured to determine a prioritization of the reverberators so that not all of them need to be used in the reverberation operation. The aim of these embodiments is to prioritize the reverberators based on perceptual criteria such that reverberators which cause the most important audible output are prioritized high and reverberators which cause a small audible effect are assigned a lower priority. In some embodiments a priority for each reverberator can be represented as a numeric value scaled between 0 and 1. Each different factor contributing to priority can add to a summary priority value with a weight, such that the weights for all factors sum to unity.

In some embodiments the reverberator priority determiner 501 comprises a reverberators associated with an acoustic environment enclosure determiner (and priority modifier) 701. The reverberators associated with an acoustic environment enclosure determiner (and priority modifier) 701 is configured to inspect whether each of the reverberators whose parameters are in the reverberator parameters 500 are associated with an acoustic environment enclosure. The enclosure is a geometric element which indicates the region within which the corresponding reverberator is to be rendered in a listener centric manner. If a reverberator does not have an acoustic enclosure it can have a (special) role in rendering such that it does not relate to any room or acoustic enclosure, and its priority can be lowered.

In some embodiments the reverberators associated with an acoustic environment enclosure determiner (and priority increaser) 701 is configured to prioritize reverberators after it determines whether there are reverberators without an acoustic enclosure (re→enclosure==nullptr) as depicted in the below code:

```
auto const& reverbEnvs = state->getReverbEnvs( );
bool hasNonBoundedAcousticEnvironment = false;
bool dropNonBoundedAcousticEnvironment = false;
for (auto const& re : reverbEnvs) {
  if (re->enclosure == nullptr) {
    hasNonBoundedAcousticEnvironment = true;
  }
}
```

In some embodiments the reverberator priority determiner 501 comprises a reverberator associated with the user enclosing acoustic environment determiner (and priority modifier) 703. The reverberator associated with the user enclosing acoustic environment determiner (and priority modifier) 703 is configured to modify the priority information based on the position of the user within the acoustic environments. The modification of the priorities for the reverberators corresponds to the acoustic environment enclosing the user receiving the highest priority and reverberators associated with acoustic environments immediately connected to the enclosing acoustic environment receiving second highest priority. To this end, the determiner 703 utilizes the enclosing geometry of each of the reverberators in reverberator parameters, its position from scene parameters, and listener pose, to determine if the listener is within one of the enclosing geometries. If listener is within an enclosing geometry then the priority of the corresponding reverberator is increased.

Furthermore in some embodiments the reverberator priority determiner 501 comprises a distance of the reverberators from the listener determiner (priority of reverberators closest to the listener modifier) 705. The distance of the reverberators from the listener determiner (priority of reverberators closest to the listener modifier) 705 is configured to determine reverberators that are those associated with enclosing geometries connected to the listener acoustic environment, as the sound from these connected geometries can leak into the current listener environment via acoustic portals or via acoustic transmission through walls. To this end, in some embodiments, the priority information is at least partly based on the distance of the listener to an acoustic environment, with a reverberator associated with an acoustic environment having a larger distance to the listener having a smaller priority than a reverberator associated with an acoustic environment having a smaller distance to the listener. Moreover, this prioritization can in some embodiments take into account whether there is a portal connection from the neighbouring acoustic environment into the current listener acoustic environment, with such reverberators associated with acoustic environments having a portal connection to the current acoustic environment obtaining a larger priority than reverberators associated with acoustic environments without a portal connection.

In some embodiments the reverberator priority determiner 501 comprises output signal levels of the reverberators determiner (priority of reverberators with the highest output levels modifier) 707. The output signal levels of the reverberators determiner (priority of reverberators with the highest output levels modifier) 707 is configured to set the priority information at least partly based on the level of reverberation in an acoustic environment, with the reverberator associated with an acoustic environment with a low reverberation level receiving a lower priority than a reverberator associated with an acoustic environment with a higher reverberation level. The level can be measured, by the reverberators 305, from the root-mean-square energy (or power) of the previous reverberator output signal for each reverberator. The root-mean-square energy may in some embodiments be averaged over several audio frames or blocks (i.e., over a time segment longer than the length of the audio segment currently being processed) to obtain smoothing over time. In some other embodiments, the reverberation level can be obtained from the DDR values associated with the acoustic environment associated with the reverberator, or from one or more gain values associated with the DDR filter of the reverberator. This kind of embodiment does not require measurement of the reverberator output level and may thus be beneficial if a computationally very light solution is desired.

Figure 8:
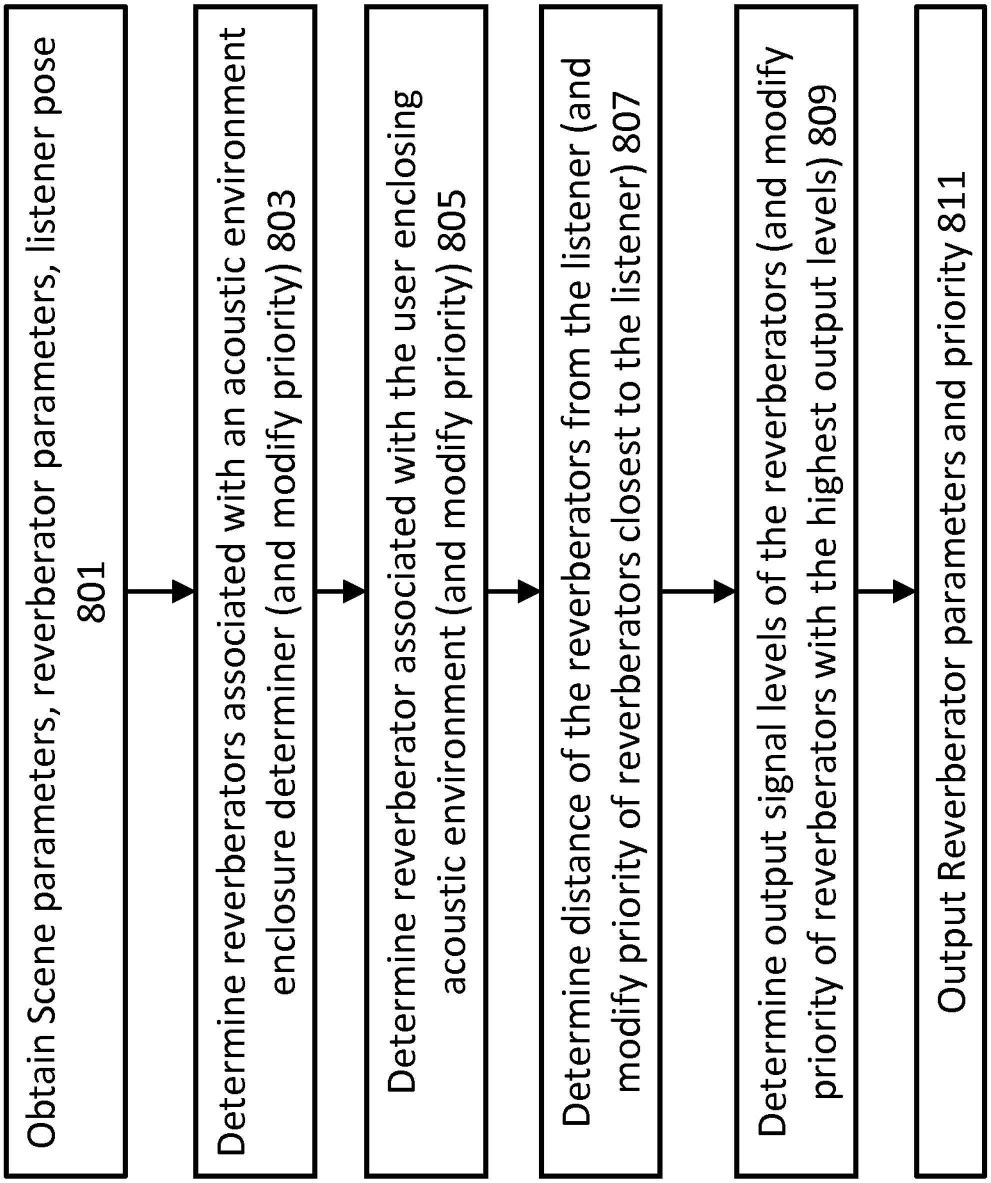
FIG. 8 shows a flow diagram of the operation of the example reverberator priority determiner as shown in FIG. 7.

With respect to FIG. 8 is shown example operations of the reverberator priority determiner 501 as shown in FIG. 7.

Thus, in some embodiments, the method comprises obtaining scene parameters, reverberator parameters, listener pose as shown in FIG. 8 by step 801.

Then the method comprises determining reverberators associated with an acoustic environment enclosure determiner (and modify the priority based on this determination) as shown in FIG. 8 by step 803.

The method can comprise determining reverberator associated with the user enclosing acoustic environment (and modify the priority based on this determination) as shown in FIG. 8 by step 805.

Further is determining a distance of the reverberators from the listener (and modify priority of reverberators closest to the listener based on this determination) as shown in FIG. 8 by step 807.

Also the method comprises determining output signal levels of the reverberators (and modify priority of reverberators with the highest output levels based on this determining) as shown in FIG. 8 by step 809.

The reverberator parameters and priority values are then output as shown in FIG. 8 by step 811.

Figure 9:
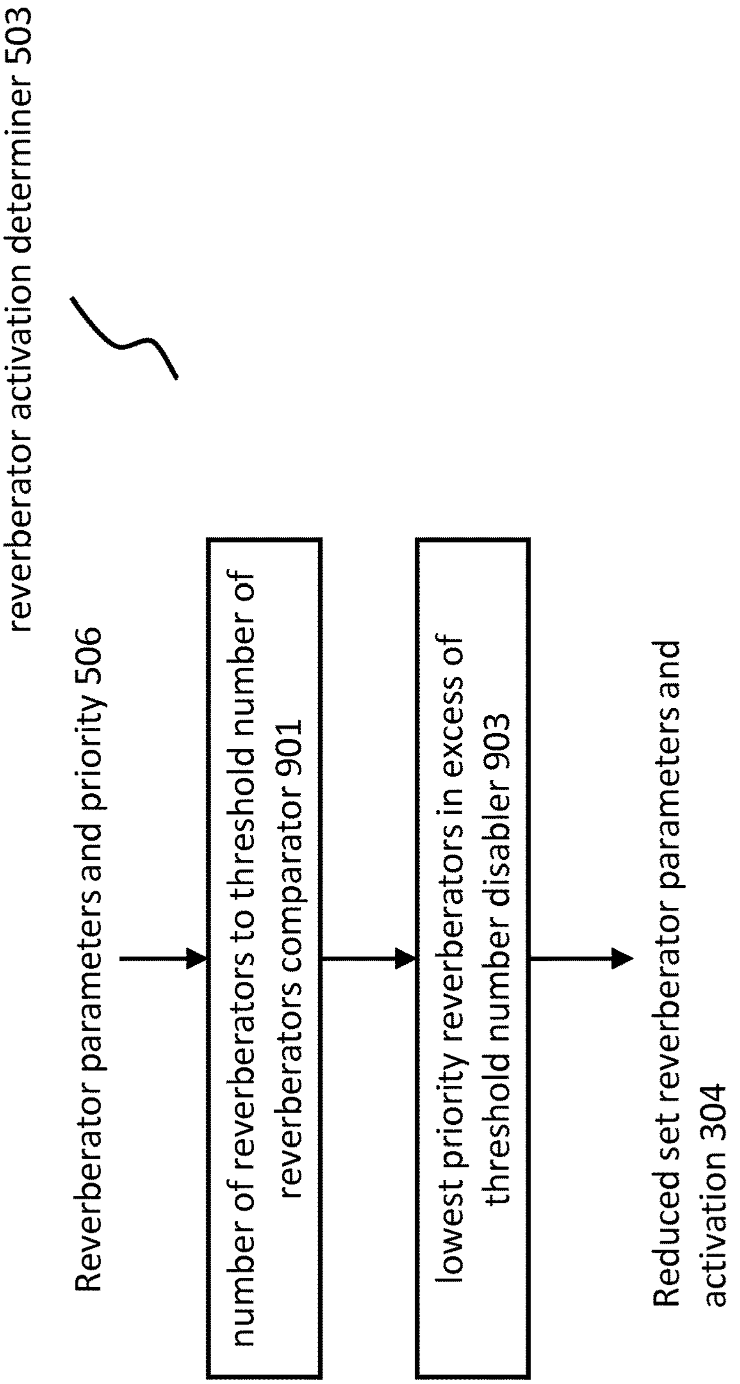
FIG. 9 shows schematically an example reverberator activation determiner as shown in FIG. 5 according to some embodiments.

With respect to FIG. 9 is shown in further detail a reverberator activation determiner 503 such as shown in FIG. 5.

The reverberator activation determiner 503 is configured to receive the reverberator parameters and their priorities 506 and determines or selects which reverberators should be initialized and/or activated. In some embodiments, the reverberator activation determiner 503 comprises a number of reverberators to threshold number of reverberators comparator 901. The number of reverberators to threshold number of reverberators comparator 901 is configured to compare the first number of reverberators to a threshold number and limiting the size of the subset to the threshold number and including the reverberators with the highest priority into the subset.

The reverberator activation determiner 503 furthermore comprises a lowest priority reverberator(s) in excess of threshold number disabler 903 which then generates information or signalling to disable the reverberators in excess of the threshold number (or enable the reverberators up to the threshold number). In some embodiments the lowest priority reverberators in excess of threshold number disabler 903 is furthermore configured to not include (or filter) the parameters of reverberators which are not in the subset into the reduced set reverberator parameters. Such control of the initialized set of reverberators by not initializing some of the reverberators is suitable for permanently reducing the computational load for a certain period. For example, during the rendering of a scene.

To obtain more dynamic activation of reverberators, e.g., during run time rendering of a scene, the reverberator activation determiner in some embodiments can also provide activation signals for the subset of reverberators whose parameters are in the reduced set of reverberator parameters.

The purpose of the activation signal (as part of the output reverberation parameters and activation 304) is to enable/disable during running some of the reverberators. The activation signal can be, for example, true or false with true indicating active and false not active, or a float gain value between 0 and 1.

In some embodiments implementation determines the size of reverberators having threshold value a bounding geometry against a (MAX_NUM_BOUNDED_AES_BEFORE-_DROPPING_DEFAULT which can have a value set to a suitable number, such as 3).

If there are at least the threshold value plus one (MAX_NUM_BOUNDED_AES_BEFORE_DROPPING_DEFAULT+1) and one of them does not have an enclosure, the method is configured to disable the reverberator corresponding the unbounded acoustic environment by setting dropNonBoundedAcousticEnvironment=true as follows:

```
if (hasNonBoundedAcousticEnvironment and reverbCount >=
(MAX_NUM_BOUNDED_AES_BEFORE_DROPPING_
DEFAULT + 1) ) {
  dropNonBoundedAcousticEnvironment = true;
  reverbCount = reverbCount − 1;
}
```

Then, when initializing the reverberators a check is done in order not to initialize a reverb which does not have an enclosure:

```
/ / a loop which initializes reverbs
for (auto const& re : reverbEnvs) {
    std::unique_ptr<Reverb> reverb;
    if (re->acousticEnvironmentBsId.has_value ( ) &&
bitstreamReverbPayload) {
        / / Drop reverb corresponding to an acoustic
environment without an enclosure
        if (dropNonBoundedAcousticEnvironment && re-
>enclosure == nullptr) {
            continue;
        }
/ / if the reverberator corresponding to re has an
enclosure the following code lines (not shown) proceeds to
provide it parameters. Alternatively, the parameters could be
included into the "Reduced set of reverberator parameters"
    ...
    }
```

Figure 10:
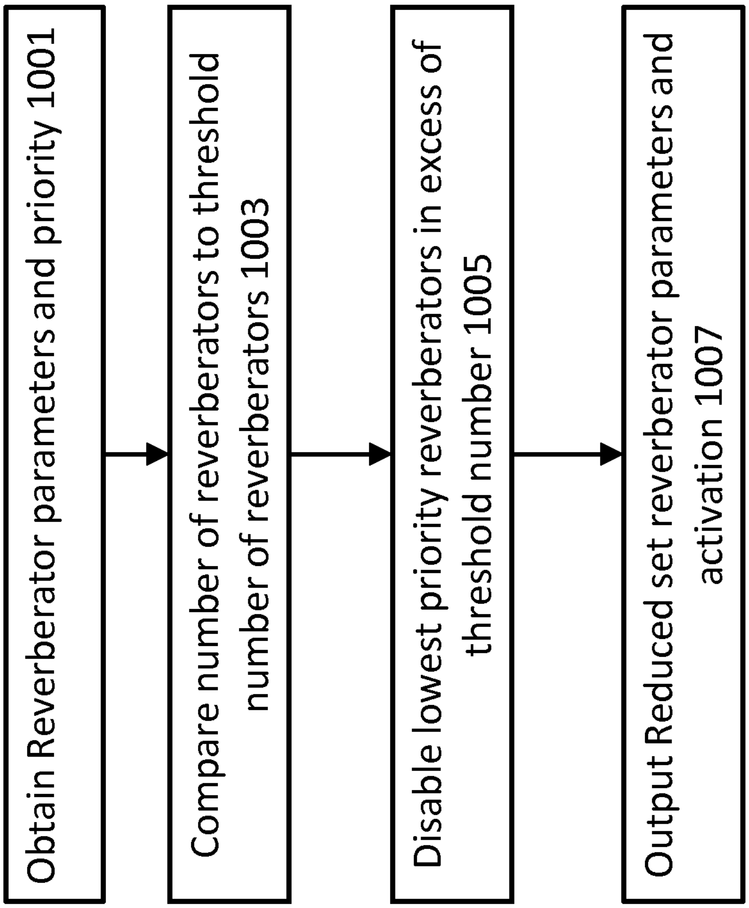
FIG. 10 shows a flow diagram of the operation of the example reverberator activation determiner as shown in FIG. 9.

With respect to FIG. 10 is shown a flow diagram showing the operations of the reverberator activation determiner according to some embodiments.

Thus for example the method shows obtaining reverberator parameters and priority information as shown in FIG. 10 by step 1001.

Then there is comparing the number of reverberators to a threshold number of reverberators as shown in FIG. 10 by step 1003.

The method may then comprise disabling lowest priority reverberators in excess of the threshold number as shown in FIG. 10 by step 1005.

Then there may be outputting a (reduced set of) reverberator parameters and activation information as shown in FIG. 10 by step 1007.

Figure 11:
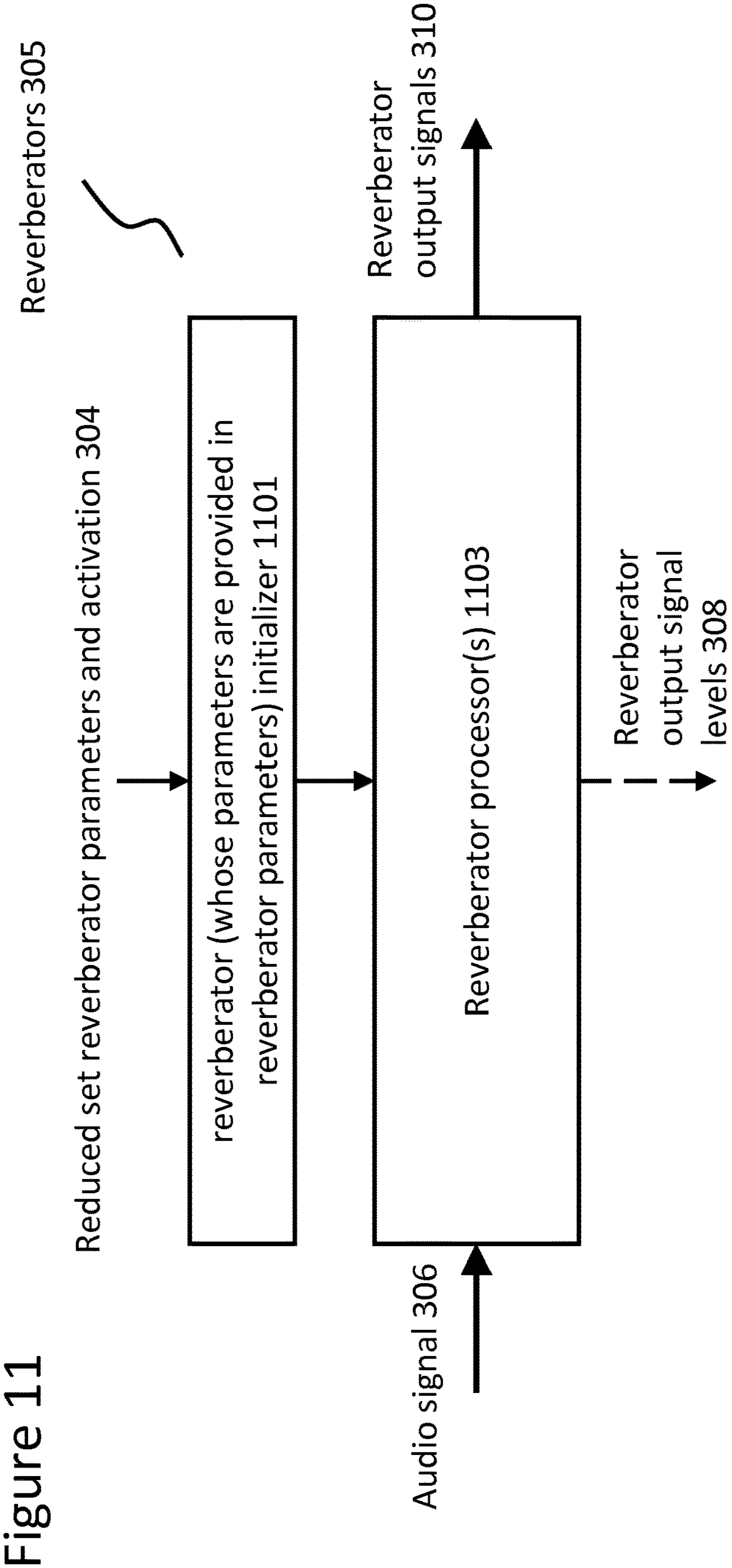
FIG. 11 shows schematically example reverberators as shown in FIG. 3 according to some embodiments.

FIG. 11 shows schematically in further detail the reverberators as shown in FIG. 3. The reverberators 305 comprise a reverberator initializer 1101 configured to receive the (reduced set of) reverberator parameters and activation information 304. The reverberator initializer 1101 is configured to configure or initialize the reverberators whose parameters are provided in the (reduced set of) reverberator parameters and controls their processing based on the activation.

In some embodiments the reverberator parameters are parameters for an FDN reverberator as described in further detail below.

In some embodiments the reverberators comprise reverberator processors 1103. The reverberator processors in some embodiments comprise FDN reverberators as shown later each of which is configured by the reverberator initializer 1101. In such embodiments after the parameters for the FDNs have been provided, the audio signal 306 is input into the reverberator processor(s) 1103 to produce a reverberator output signals 310 having desired reverberation characteristics. In some embodiments there are several FDN reverberators running in parallel. For example these can be employed, one FDN per one Acoustic Environment. Each FDN can then be configured with its own parameters and own output signals.

In some embodiments the activation signal, when it is a float gain value, e.g., between 0 and 1 can be applied as a gain value into the output channel gains Ca of a reverberator as shown further on.

The resulting reverberator output signals 310 $s_{rev,r}(j, t)$ (where j is the output audio channel index and r the reverberator index) are the output of the reverberator processor(s) 1103.

Furthermore in some embodiments the reverberator processor(s) is configured to generate and output reverberator output signal levels 308.

Figure 12:
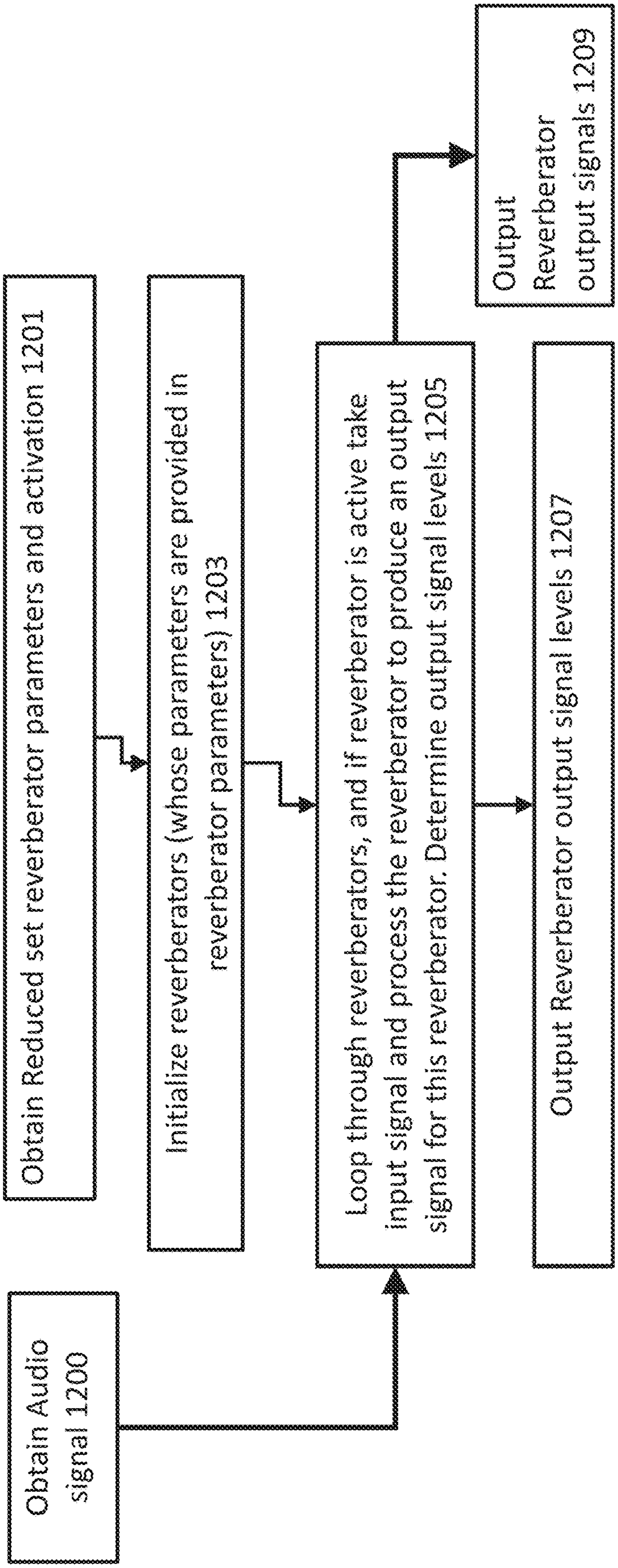
FIG. 12 shows a flow diagram of the operation of the example reverberators as shown in FIG. 11.

With respect to FIG. 12 is shown a flow diagram of the operation of the reverberators 305 according to some embodiments.

For example the reverberators are configured to obtain audio signals as shown in FIG. 12 by step 1200 and further obtain the (reduced set of) reverberator parameters and activation information as shown in FIG. 12 by step 1201.

Then based on the obtained reverberator parameters and activation information then the reverberators are initialized using the parameters (where the parameters are provided in the reverberator parameters) as shown in FIG. 12 by step 1203.

Then in some embodiments the method is configured to loop through the reverberator processors, and if a reverberator processor is active take an input audio signal and process the reverberator to produce an output reverberated audio signal for this reverberator. Furthermore there is a determination of the output signal levels. The reverberation processing and output signal level determination is shown in FIG. 12 by step 1205.

The output of the signal levels is shown in FIG. 12 by step 1207.

The output of the reverberator output signals (the reverberated audio signals) is shown in FIG. 12 by step 1209.

Figure 13:
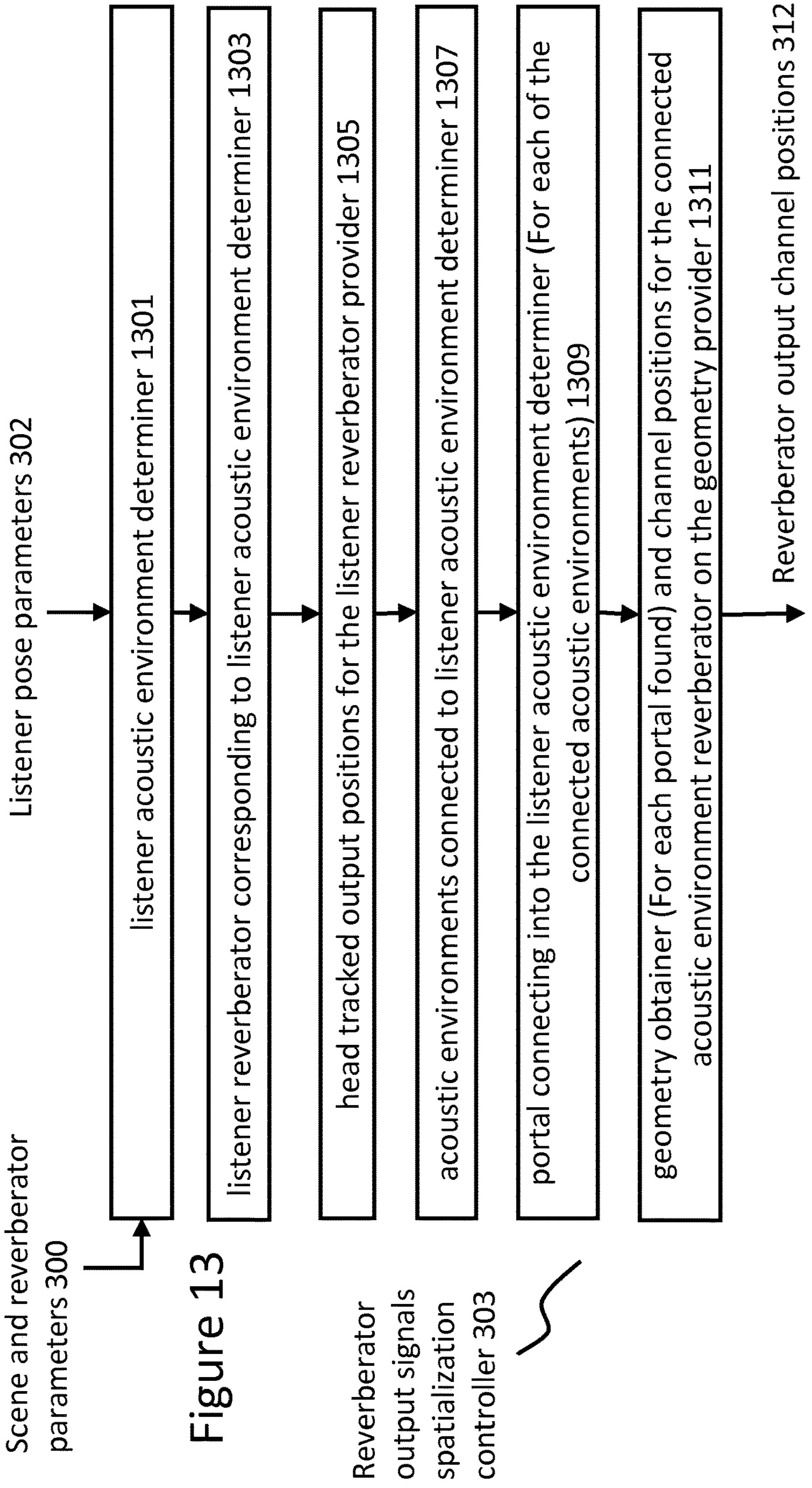
FIG. 13 shows schematically an example reverberator output signals spatialization controller as shown in FIG. 3 according to some embodiments.

With respect to FIG. 13 there is shown in further detail the reverberator output signals spatialization controller 303 as shown in FIG. 3.

The reverberator output signals spatialization controller 303 is configured to receive the scene and reverberator parameters 300 and listener pose parameters 302. The reverberator output signals spatialization controller 303 is configured to use the listener pose parameters 302 and scene and reverberator parameters 300 to determine the acoustic environment where the listener currently is and provide that reverberator output channels such positions which surround the listener. This means that the reverberation when inside an acoustic enclosure, caused by that acoustic enclosure, is rendered as a diffuse signal enveloping the listener.

In some embodiments the reverberator output signals spatialization controller 303 comprises a listener acoustic environment determiner 1301 configured to obtain the scene and reverberator parameters 300 and listener pose parameters 302 and determine the listener acoustic environment.

In some embodiments the reverberator output signals spatialization controller 303 comprises a listener reverberator corresponding to listener acoustic environment determiner 1303 which is further configured to determine listener reverberator corresponding to listener acoustic environment information.

In some embodiments the reverberator output signals spatialization controller 303 comprises a head tracked output positions for the listener reverberator provider 1305 configured to provide or determine the head tracked output positions for the listener.

In some embodiments the reverberator output signals spatialization controller 303 comprises an acoustic environments connected to listener acoustic environment determiner 1307 configured to determine any acoustic environments connected to listener acoustic environments.

In some embodiments the reverberator output signals spatialization controller 303 comprises a portal connecting into the listener acoustic environment determiner (For each of the connected acoustic environments) 1309 which is configured to determine, for each of the connected acoustic environments, any portals connecting into the listener acoustic environment.

In some embodiments the reverberator output signals spatialization controller 303 comprises a geometry obtainer (For each portal found) and channel positions for the connected acoustic environment reverberator on the geometry provider 1311 which is configured to obtain the geometry (for each portal) and provide the channel positions for the connected acoustic environment reverberators.

The output of the reverberator output signals spatialization controller 303 is thus the reverberator output channel positions 312.

Figure 14:
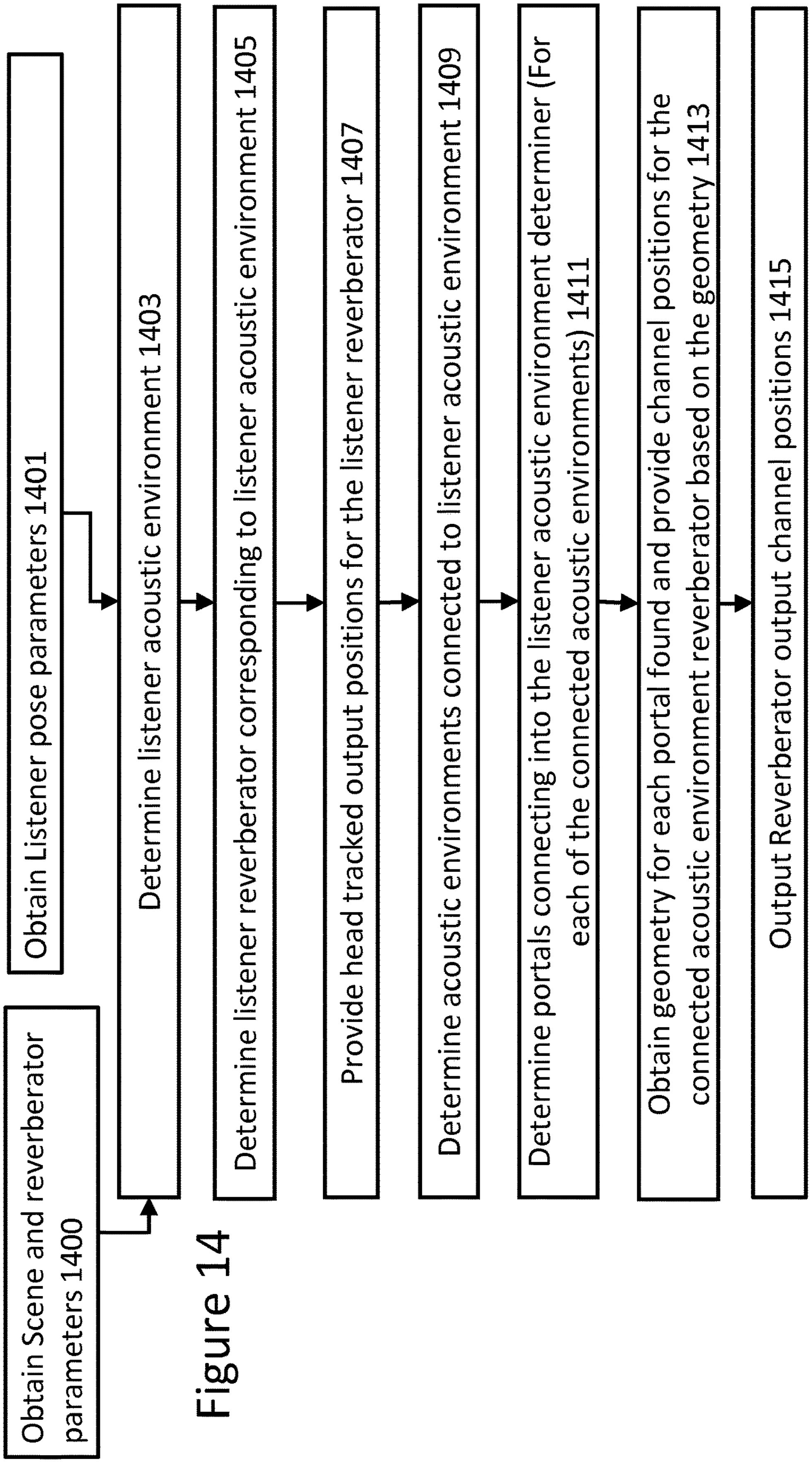
FIG. 14 shows a flow diagram of the operation of the example reverberator output signals spatialization controller as shown in FIG. 13.

With respect to FIG. 14 is shown the operations of an example reverberator output signals spatialization controller 303 according to some embodiments.

Thus for example is shown obtaining scene and reverberator parameters as shown in FIG. 14 by step 1400 and obtaining listener pose parameters as shown in FIG. 14 by step 1401.

Then the method comprises determining listener acoustic environment as shown in FIG. 14 by step 1403.

Having determined this then determine listener reverberator corresponding to listener acoustic environment as shown in FIG. 14 by step 1405.

Further the method comprises providing head tracked output positions for the listener reverberator as shown in FIG. 14 by step 1407.

The method comprises determining acoustic environments connected to listener acoustic environment as shown in FIG. 14 by step 1409.

Then for each of the connected acoustic environments determine portals connecting into the listener acoustic environment determiner as shown in FIG. 14 by step 1411.

Then the method comprises obtaining geometry for each portal found and providing channel positions for the connected acoustic environment reverberator based on the geometry as shown in FIG. 14 by step 1413.

Then there is outputting reverberator output channel positions as shown in FIG. 14 by step 1415.

In some embodiments, the reverberator corresponding to the acoustic environment where the user currently is, is rendered by the reverberator output signals spatializer 307 as an immersive audio signal surrounding the user. That is, the signals in $s_{rev,r}(j, t)$ corresponding to the listener environment are rendered as point sources surrounding the listener.

Other reverberators may be audible in the current environment via acoustic portals. The reverberator output signals spatialization controller 303 uses portal position information carried in scene parameters to provide in reverberator output channel positions suitable positions for the reverberator outputs which correspond to portals. To obtain a spatially extended perception of the portal sound, the output channels corresponding to reverberators which are to be rendered at a portal are provided positions along the portal geometry which divides two acoustic spaces.

Figure 15:
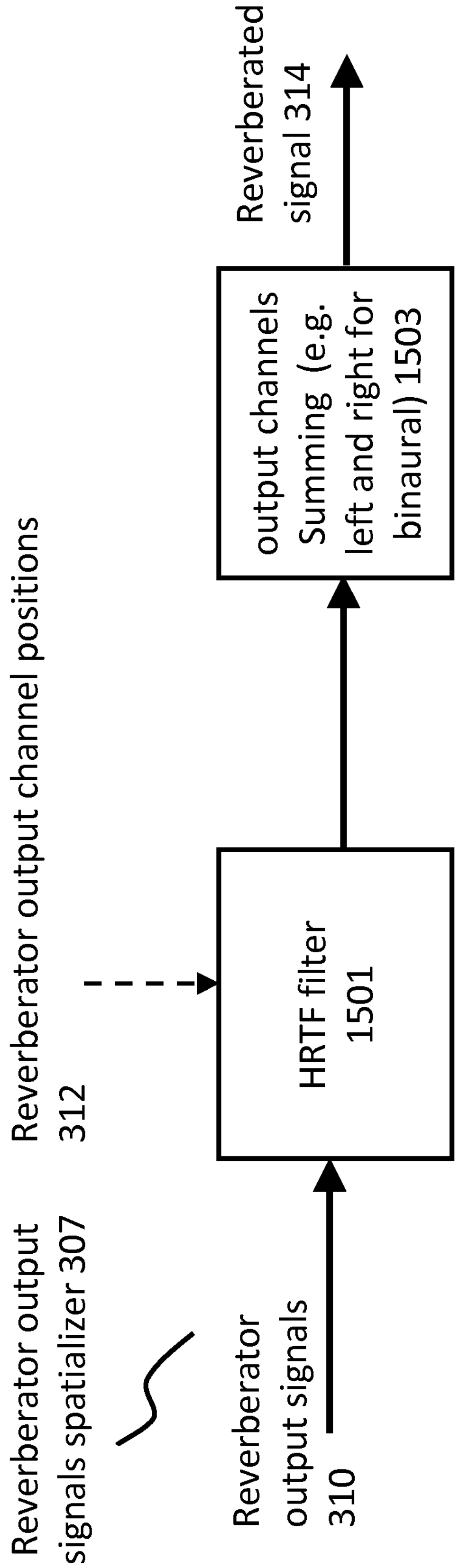
FIG. 15 shows schematically an example reverberator output signals spatializer as shown in FIG. 3 according to some embodiments.

With respect to FIG. 15 there is shown in further detail the reverberator output signals spatializer 307. The reverberator output signals spatializer 307 is configured to receive the positions 312 from the reverberator output signals spatialization controller 303. Additionally is received the reverberator output signals 310 from the reverberators 305.

In some embodiments the reverberator output signals spatializer comprises a head-related transfer function (HRTF) filter 1501 which is configured to render each reverberator output into a desired output format (such as binaural).

Furthermore in some embodiments the reverberator output signals spatializer comprises a output channels combiner 1503 which is configured to combine (or sum) the signals to produce the output reverberated signal 314.

Thus for example for binaural reproduction the reverberator output signals spatializer 307 can use HRTF filtering to render the reverberator output signals in their desired positions indicated by reverberator output channel positions.

Figure 16:
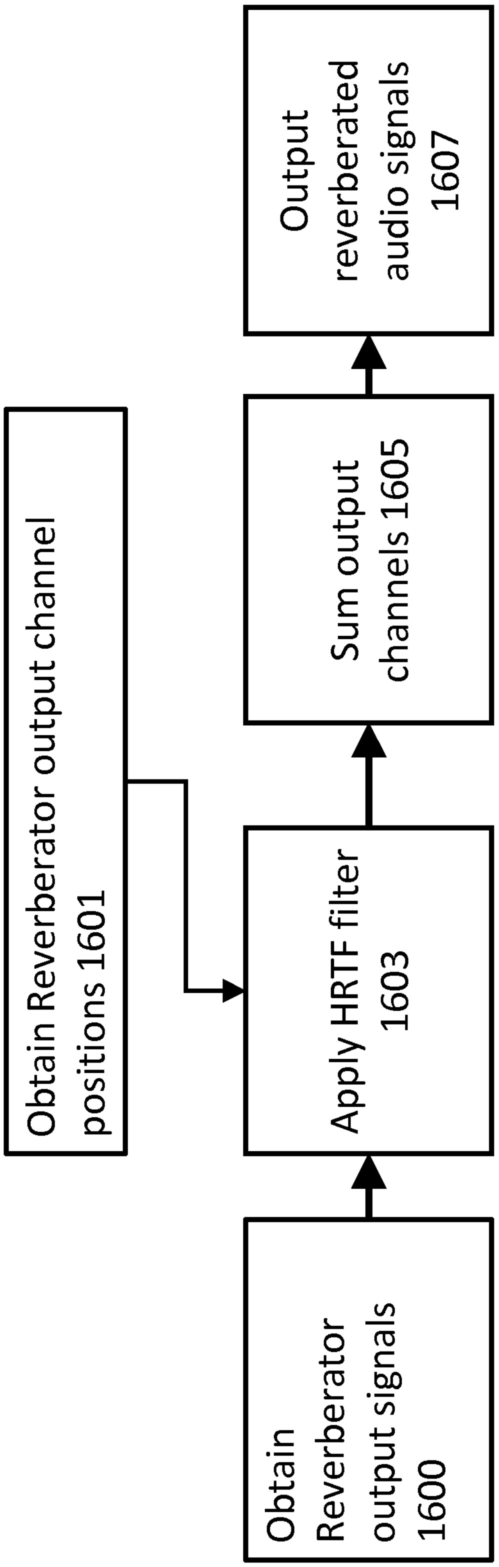
FIG. 16 shows a flow diagram of the operation of the example Reverberator output signals spatializer as shown in FIG. 15.

With respect to FIG. 16 is shown a flow diagram showing the operations of the reverberator output signals spatializer according to some embodiments.

Thus the method can comprise obtaining reverberator output signals as shown in FIG. 16 by step 1600 and obtaining reverberator output channel positions as shown in FIG. 16 by step 1601.

Then the method may comprise applying a HRTF filter configured by the reverberator output channel positions to the reverberator output signals as shown in FIG. 16 by step 1603.

The method may then comprise summing or combining the output channels as shown in FIG. 16 by step 1605.

Then the reverberated audio signals can be output as shown in FIG. 16 by step 1607.

Figure 17:
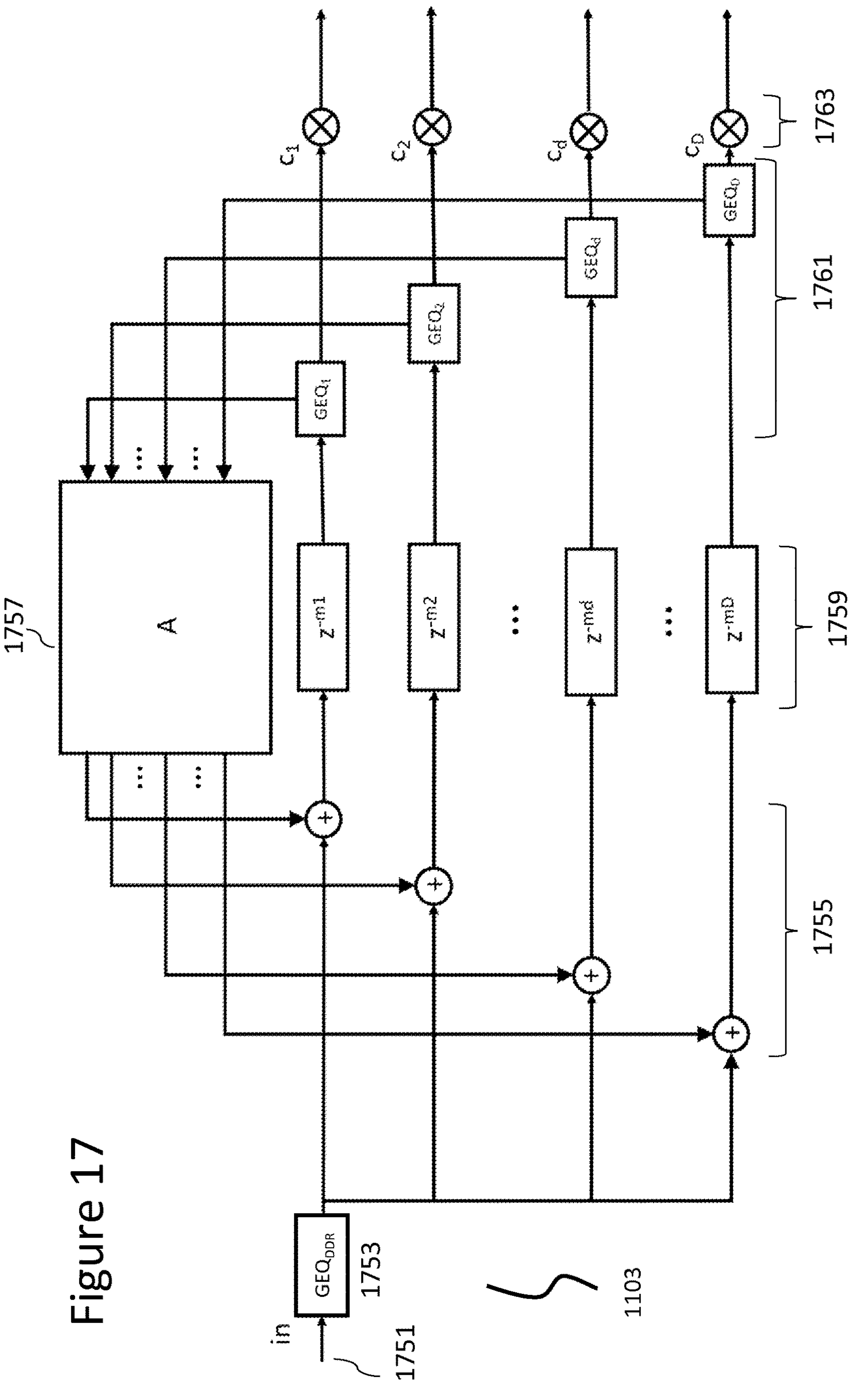
FIG. 17 shows schematically an example FDN reverberator as shown in FIG. 12 according to some embodiments.

With respect to FIG. 17 is shown an example reverberator 1103 according to some embodiments. The reverberator 1103 which is enabled or configured to produce reverberation whose characteristics match the room parameters. There may be several of such reverberators, each parameterized based on the reverberation characteristics of an acoustic environment. An example reverberator implementation comprises a feedback delay network (FDN) reverberator and DDR control filter which enables reproducing reverberation having desired frequency dependent RT60 times and levels. The room parameters are used to adjust the FDN reverberator parameters such that it produces the desired RT60 times and levels. An example of a level parameter can the direct-to-diffuse-ratio (DDR) (or the diffuse-to-total energy ratio as used in MPEG-I). The output from the FDN reverberator are the reverberated audio signals which for binaural headphone reproduction are then reproduced into two output signals and for loudspeaker output means typically more than two output audio signals. Reproducing several outputs such as 15 FDN delay line outputs to binaural output can be done, for example, via HRTF filtering.

FIG. 17 shows an example FDN reverberator in further detail and which can be used to produce D uncorrelated output audio signals. In this example each output signal can be rendered at a certain spatial position around the listener for an enveloping reverb perception.

The example FDN reverberator is configured such that the reverberation parameters are processed to generate coefficients $GEQ_d$ ($GEQ_1$, $GEQ_2$, . . . $GEQ_D$) of each attenuation filter 1761, feedback matrix 1757 coefficients A, lengths $m_d$ ($m_1$, $m_2$, . . . $m_D$) for D delay lines 1759 and DDR energy ratio control filter 1753 coefficients $GEQ_{ddr}$. The example FDN reverberator 1103 thus shows a D-channel output, by providing the output from each FDN delay line as a separate output.

In some embodiments each attenuation filter $GEQ_d$ 1761 is implemented as a graphic EQ filter using M biquad IIR band filters. With octave bands M=10, thus, the parameters of each graphic EQ comprise the feedforward and feedback coefficients for biquad IIR filters, the gains for biquad band filters, and the overall gain. In some embodiments any suitable manner may be implemented to determine the FDN reverberator parameters, for example the method described in GB patent application GB2101657.1 can be implemented for deriving FDN reverberator parameters such that the desired RT60 time for the virtual/physical scene can be reproduced.

The reverberator uses a network of delays 1759, feedback elements (shown as attenuation filters 1761, feedback matrix 1757 and combiners 1755 and output gain 1763) to generate a very dense impulse response for the late part. Input samples 1751 are input to the reverberator to produce the reverberation audio signal component which can then be output.

The FDN reverberator comprises multiple recirculating delay lines. The unitary matrix A 1757 is used to control the recirculation in the network. Attenuation filters 1761 which may be implemented in some embodiments as graphic EQ filters implemented as cascades of second-order-section IIR filters can facilitate controlling the energy decay rate at different frequencies. The filters 1761 are designed such that they attenuate the desired amount in decibels at each pulse pass through the delay line and such that the desired RT60 time is obtained. Thus the input to the encoder can provide the desired RT60 times per specified frequencies f denoted as RT60(f). For a frequency f, the desired attenuation per signal sample is calculated as attenuationPerSample(f)=−60/(samplingRate*RT60(f)). The attenuation in decibels for a delay line of length $m_d$ is then attenuationDb(f)=$m_d$*attenuationPerSample(f).

The attenuation filters are designed as cascade graphic equalizer filters as described in V. Välimäki and J. Liski, "Accurate cascade graphic equalizer," IEEE Signal Process. Lett., vol. 24, no. 2, pp. 176-180, February 2017 for each delay line. The design procedure outlined in the paper referenced above takes as an input a set of command gains at octave bands. There are also methods for a similar graphic EQ structure which can support third octave bands, increasing the number of biquad filters to 31 and providing better match for detailed target responses as described in Rämö, J, Liski, J & Välimäki, V 2020, 'Third-octave and Bark graphic-equalizer design with symmetric band filters', Applied Sciences (Switzerland), vol. 10, no. 4, 1222. https://doi.org/10.3390/app10041222.

Furthermore in some embodiments the design procedure of V. Välimäki and J. Liski, "Accurate cascade graphic equalizer," IEEE Signal Process. Lett., vol. 24, no. 2, pp. 176-180, February 2017 is also used to design the parameters for the reverb DDR control filter $GEQ_{DDR}$. The input to the design procedure are the reverberation gains in decibels.

The parameters of the FDN reverberator can be adjusted so that it produces reverberation having characteristics matching the input room parameters. For this reverberator the parameters contain the coefficients of each attenuation filter $GEQ_d$, 1761, feedback matrix coefficients A 1757, lengths $m_d$ for D delay lines 1759, and spatial positions for the delay lines d.

The number of delay lines D can be adjusted depending on quality requirements and the desired tradeoff between reverberation quality and computational complexity. In an embodiment, an efficient implementation with D=15 delay lines is used. This makes it possible to define the feedback matrix coefficients A as proposed by Rocchesso: Maximally Diffusive Yet Efficient Feedback Delay Networks for Artificial Reverberation, IEEE Signal Processing Letters, Vol. 4. No. 9, September 1997 in terms of a Galois sequence facilitating efficient implementation.

A length ma for the delay line d can be determined based on virtual room dimensions. For example, a shoebox (or cuboid) shaped room can be defined with dimensions xDim, yDim, zDim. If the room is not cuboid shaped (or shaped as a shoebox) then a shoebox or cuboid can be fitted inside the room and the dimensions of the fitted shoebox can be utilized for the delay line lengths. Alternatively, the dimensions can be obtained as three longest dimensions in the non-shoebox shaped room, or other suitable method.

The delays can in some embodiments can be set proportionally to standing wave resonance frequencies in the virtual room or physical room. The delay line lengths ma can further be configured as being mutually prime in some embodiments.

The parameters of the FDN reverberator are adjusted so that it produces reverberation having characteristics matching the desired RT60 and DDR for the acoustic environment to which this FDN reverberator is to be associated. The adjustment of the parameters is done by the encoder in our current implementation for VR scenes and written into a bitstream, and in the renderer for AR scenes.

Reverberation ratio parameters can refer to the diffuse-to-total energy ratio (DDR) or reverberant-to-direct ratio (RDR) or other equivalent representation. The ratio parameters can be equivalently represented on a linear scale or logarithmic scale.

Figure 18:
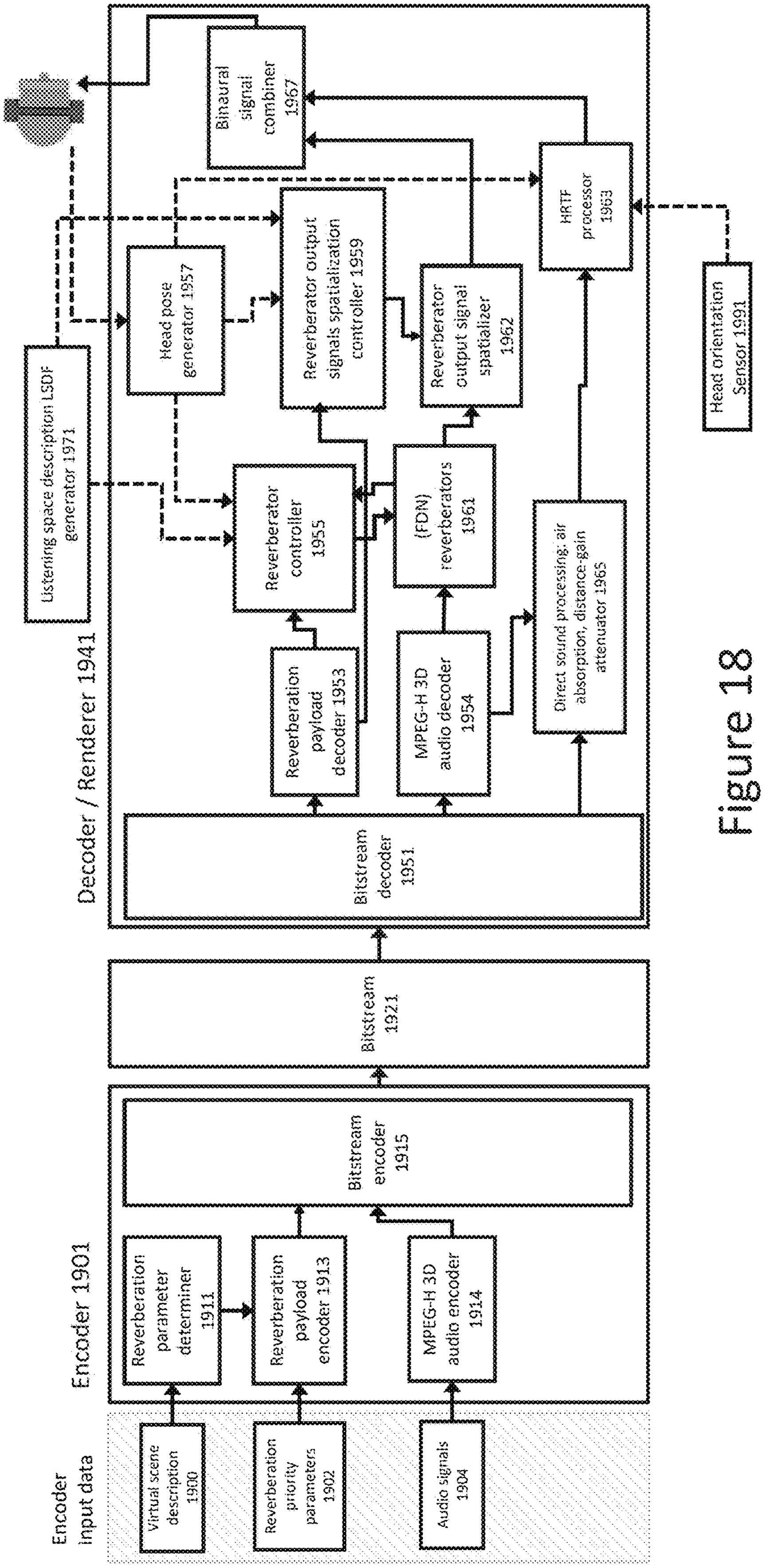
FIG. 18 shows schematically an example apparatus with transmission and/or storage within which some embodiments can be implemented.

FIG. 18 shows schematically an example system where the embodiments are implemented in an encoder device 1901 which performs part of the functionality; writes data into a bitstream 1921 and transmits that for a renderer device 1941, which decodes the bitstream, performs reverberator processing according to the embodiments and outputs audio for headphone listening.

The encoder side 1901 of FIG. 18 can be performed on content creator computers and/or network server computers. The output of the encoder is the bitstream 1921 which is made available for downloading or streaming. The decoder/renderer 1941 functionality runs on end-user-device, which can be a mobile device, personal computer, sound bar, tablet computer, car media system, home HiFi or theatre system, head mounted display for AR or VR, smart watch, or any suitable system for audio consumption.

The encoder 1901 is configured to receive the virtual scene description 1900, the reverberation priority parameters 1902 and the audio signals 1904. The virtual scene description 1900 can be provided in the MPEG-I Encoder Input Format (EIF) or in other suitable format. Generally, the virtual scene description contains an acoustically relevant description of the contents of the virtual scene, and contains, for example, the scene geometry as a mesh, acoustic materials, acoustic environments with reverberation parameters, positions of sound sources, and other audio element related parameters such as whether reverberation is to be rendered for an audio element or not. The encoder 1901 in some embodiments comprises a reverberation parameter determiner 1911 configured to receive the virtual scene description 1900 and configured to obtain the reverberation parameters. The reverberation parameters can in an embodiment be obtained from the RT60, DDR, predelay, and region/enclosure parameters of acoustic environments.

The encoder 1901 furthermore in some embodiments comprises a reverberation payload encoder 1913 configured to obtain the determined reverberation parameters and the reverberation ratio handling parameters and generate reverberation parameters.

The encoder 1901 further comprises a MPEG-H 3D audio encoder 1914 configured to obtain the audio signals 1904 and MPEG-H encode them and pass them to a bitstream encoder 1915.

The encoder 901 furthermore in some embodiments comprises a bitstream encoder 1915 which is configured to receive the output of the reverberation payload encoder 1913 and the encoded audio signals from the MPEG-H encoder 1914 and generate the bitstream 1921 which can be passed to the bitstream decoder 1941. The bitstream 1921 in some embodiments can be streamed to end-user devices or made available for download or stored.

The decoder 1941 in some embodiments comprises a bitstream decoder 1951 configured to decode the bitstream.

The decoder 1941 further can comprise a reverberation payload decoder 1953 configured to obtain the encoded reverberation parameters and decode these in an opposite or inverse operation to the reverberation payload encoder 1913.

The listening space description LSDF generator 1971 is configured to generate and pass the LSDF information to the reverberator controller 1955 and the reverberator output signals spatialization controller 1959.

Furthermore the head pose generator 1957 receives information from a head mounted device or similar and generates head pose information or parameters which can be passed to the reverberator controller 1955, the reverberator output signals spatialization controller 1959 and HRTF processor 1963.

The decoder 1941, in some embodiments, comprises a reverberator controller 1955 which also receives the output of the reverberation payload decoder 1953 and generates the reverberation parameters for configuring the reverberators and passes this to the reverberators 1961.

In some embodiments the decoder 1941 comprises a reverberator output signals spatialization controller 1959 configured to configured the reverberator output signals spatializer 1962.

The decoder 1941 comprise MPEG-H 3D audio decoder 1954 which is configured to decode the audio signals and pass them to the (FDN) reverberators 1961 and direct sound processing 1955.

The decoder 1941 furthermore comprises (FDN) reverberators 1961 configured by the reverberator controller 1955 and configured to implement a suitable reverberation of the audio signals. In some embodiments prioritizing the reverberators and activating a subset of them can be configured by the reverberation controller 1955.

The output of the (FDN) reverberators 1961 is configured to output to a reverberator output signal spatializer 1962.

In some embodiments the decoder 1941 comprises a reverberator output signal spatializer 1962 configured to apply the spatialization and output to the binaural combiner 1967.

Additionally the decoder/renderer 1941 comprises a direct sound processor 1965 which is configured to receive the decoded audio signals and configured to implement any direct sound processing such as air absorption and distance-gain attenuation and which can be passed to a HRTF processor 1963 which with the head orientation determination (from a suitable sensor 1991) can generate the direct sound component which with the reverberant component from the HRTF processor 1963 is passed to a binaural signal combiner 1967. The binaural signal combiner 1967 is configured to combine the direct and reverberant parts to generate a suitable output (for example for headphone reproduction).

Furthermore in some embodiments the decoder comprises a head orientation determiner 1991 which passes the head orientation information to the HRTF processor 1963.

Although not shown, there can be various other audio processing methods applied such as early reflection rendering combined with the proposed methods.

As indicated earlier MPEG-I Audio Phase 2 will normatively standardize the bitstream and the renderer processing. There will also be an encoder reference implementation, but it can be modified later on as long as the output bitstream follows the normative specification. This allows improving the codec quality also after the standard has been finalized with novel encoder implementations.

The portions going to different parts of the MPEG-I standard can be:

- Encoder reference implementation will contain
  - Deriving the reverberator parameters for each of the acoustic environments based on their RT60, DDR, predelay, and dimensions
  - Obtaining scene parameters from the encoder input and writing them into the bitstream. This contains at least the positions and geometries of each acoustic enclosure and the positions and geometries of the acoustic portals which connect the acoustic enclosures.
  - Obtaining reverberator priority information from a content creator (or automatically based on the scene parameters)
  - Writing a bitstream description containing the (optional) reverberator parameters and scene parameters and the priority information. If there is at least one virtual enclosure with reverberation parameter in the Virtual scene description, then there will be parameters for the corresponding reverberator written into the Reverb payload.
- The normative bitstream shall contain (optional) reverberator parameters with the priority information described using the syntax described here. The bitstream shall be streamed to end-user devices or made available for download or stored.
- The normative renderer shall decode the bitstream to obtain the scene and reverberator parameters, and perform the reverberation prioritization, activation, and rendering as described in this invention.
  - For VR rendering, reverberator and scene parameters are derived in the encoder and sent in the bitstream.
  - For AR rendering, reverberator parameters and scene are derived in the renderer based on a listening space description format (LSDF) file or corresponding representation.
- The complete normative renderer will also obtain other parameters from the bitstream related to room acoustics and sound source properties, and use them to render the direct sound, early reflection, diffraction, sound source spatial extent or width, and other acoustic effects in addition to diffuse late reverberation. The invention presented here focuses on the rendering of the diffuse late reverberation part and in particular how to reduce the computational load when several reverberators are running in parallel for multiple acoustic environments.

Furthermore there is herein shown example bit stream syntax and semantics descriptions:

In some embodiments a renderer side decision making can be performed for disabling one or more reverberators for the one or more acoustic environments based on content creator or encoder determined priorities.

| REVERB METADATA | bits | Mnemonic |
|---|---|---|
| reverbPayloadStruct( ){ | | |
| numberOfSpatialPositions; | 2 | bslbf |
| for(int i=0;i<numberOfSpatialPositions;i++){ | | |
| azimuth; | 9 | tcimsbf |
| elevation; | 9 | tcimsbf |
| } | | |
| numberOfAcousticEnvironments; | 8 | uimsbf |
| hasReverbCount; | 1 | uimsbf |
| if(hasReverbCountLimit) | | |
| reverbCountLimit; | 3 | uimsbf |
| PaddingBits; | 4 | Uimsbf |
| for(int i=0;i<numberOfAcousticEnvironments;i++){ | | |
| environmentsId; | 16 | tcimsbf |
| filterParamsStruct( ); | | |
| hasPriorityInfo; | 1 | uimsbf |
| if(hasPriorityInfo){ | | |
| reverb_priority; | 4 | uimsbf |
| is_bounded_ae; | 1 | uimsbf |
| } | | |
| for(int j=0;j<numberOfSpatialPositions;j++){ | | |
| delayLineLength; | 32 | uimsbf |
| filterParamsStruct( ); | | |
| } | | |
| } | | |

Where the semantics of reverbPayloadStruct( ) are as follows

- numberOfSpatialPositions defines the number of output delay line positions for the late reverb payload. This value is defined using an index which corresponds to a specific number of delay lines. The value of the bit string '0b00' signals the renderer to a value of 15 spatial orientations for delay lines. The other three values '0b01', '0b10' and '0b11' are reserved.
- azimuth defines azimuth of the delay line with respect to the listener. The range is between −180 to 180 degrees.
- elevation defines the elevation of the delay line with respect to the listener. The range is between −90 to 90 degrees.
- numberOfAcousticEnvironments defines the number of acoustic environments in the audio scene. The reverbPayloadStruct( ) carries information regarding the one or more acoustic environments which are present in the audio scene at that time. An acoustic environment has certain "Room parameters" such as RT60 times which are used to obtain FDN reverb parameters.
- environmentId This value defines the unique identifier of the acoustic environment.
- delayLineLength defines the length in units of samples for the graphic equalizer (GEQ) filter used for configuration of the delay line attenuation filter. The lengths of different delay lines corresponding to the same acoustic environment are mutually prime.
- filterParamsStruct( ) this structure describes the graphic equalizer cascade filter to configure the attenuation filter for the delay lines. The same structure is also used subsequently to configure the filter for diffuse-to-direct reverberation ratio and reverberation source directivity gains. The details of this structure are described in the next table.

The semantics of filterParamsStruct( ) are as follows:

SOSLength is the length of the each of the second order section filter coefficients.

b1, b2, a1, a2 The filter is configured with coefficients b1, b2, a1 and a2. These are the feedforward and feedback IIR filter coefficients of the second-order section IIR filters.

globalGain specifies the gain factor in decibels for the GEQ.

levelDB specifies a sound level offset for each of the delay lines in decibels.

The semantics for disabling of reverberators is as follows:

hasPriorityInfo flag equal to 1 indicates the presence of priority information for reverb rendering for each of the acoustic environment. A value of 0 indicates that there is no priority information provided for in the reverb rendering metadata.

reverb_priority is the priority of the reverb, where a higher value indicates higher priority.

is_bounded_ae flag equal to 1 indicates the acoustic environment has an associated non acoustically transparent enclosure geometry. A value of 0 indicates there is no bound (acoustic enclosure) for this particular reverb rendering.

hasReverbCountLimit flag equal to 1 indicates the presence of an upper limit for the number of parallel reverberators supported by the content creator and it provided in the metadata. In some embodiments, the encoder can generate this parameter independently of the content creator. This value provides the ability to play content comprising many reverberators on resource constrained playback devices. If the value is equal to 0, the upper bound is not specified in the bitstream. In such scenarios, different implementations can choose to disable reverb based on the computational resources of the rendering device. However, such implementation dependent reverb count limit can result in non-uniform user experience across devices with different computational resources.

reverbCountLimit indicates the maximum number of reverberators that can be executed in parallel.

A further example is where there is metadata for disabling reverbs such that it depends on the listener's current position. For example, depending on the current acoustic environment as well as the position of the listener within an acoustic environment. This example enables versatile method for specifying parameters to make judgment for disabling reverberators by the renderer during runtime.

| REVERB METADATA | bits | Mnemonic |
|---|---|---|
| reverbPayloadStruct( ){ | | |
| numberOfSpatialPositions; | 2 | bslbf |
| for(int i=0;i<numberOfSpatialPositions;i++){ | | |
| azimuth; | 9 | tcimsbf |
| elevation; | 9 | tcimsbf |
| } | | |
| numberOfAcousticEnvironments; | 8 | uimsbf |
| hasReverbCount; | 1 | uimsbf |
| if(hasReverbCountLimit) | | |
| reverbCountLimitCC; | 4 | uimsbf |
| PaddingBits; | 3 | uimsbf |
| for(int i=0;i<numberOfAcousticEnvironments;i++){ | | |
| environmentsId; | 16 | tcimsbf |
| filterParamsStruct( ); | | |
| hasReverbScalingStruct; | 1 | uimsbf |
| if(hasReverbScalingStruct){ | | |
| ReverbScalingStruct( ); | 4 | uimsbf |
| } | | |
| for(int j=0;j<numberOfSpatialPositions;j++){ | | |
| delayLineLength; | 32 | uimsbf |
| filterParamsStruct( ); | | |
| } | | |
| } | | |

| REVERB DISABLE METADATA | bits | Mnemonic |
|---|---|---|
| reverbScalingStruct( ){ | | |
| num_AEs; | 3 | uimsbf |
| for(int i=0;i<num_AEs;i++){ | | |
| neighbor_AE_id; | 16 | tcimsbf |
| priority_type_1_present; | 1 | uimsbf |
| priority_type_2_present; | 1 | uimsbf |
| priority_type_3_present; | 1 | uimsbf |
| PaddingBits; | 5 | uimsbf |
| if(priority_type_1_present) | | |
| disable distance; | 32 | uimsbf |
| if(priority_type_2_present){ | | |
| disable_hops; | 4 | uimsbf |
| PaddingBits; | 4 | uimsbf |
| } | | |
| } | | |
| } | | |

Semantics for disabling of reverberator in reverbScalingStruct( ) are as follows:

num_AE indicates the number of AEs other than the current AE having the id environmentsld. Typically, num_AE is less than the number of acoustic environments in the audio scene.

neighbor_AE_id indicates the acoustic environment identifier of the AE for which the various priority values are specified in the reverbScalingStruct( ).

priority_type_1_present equal to 1 indicates the distance threshold value is provided in the reverbScalingStruct ( ) A value equal to 0 indicates that the distance threshold for disabling reverb is not present.

priority_type_2_present equal to 1 indicates the neighborhood AE is present and also indicates the number of hops with respect to the current AE (i.e. environmentsld in reverbPayloadStruct( ) A value equal to 0 indicates that the hop threshold for disabling reverb is not present. For example, a hop value of 0 indicates only the current AE is not disabled. A value equal to 1 indicates only the immediate neighbor AEs with respect to the current AE are not disabled.

disable_distance indicates the distance threshold value in meters is provided with respect to the listener. If a listener is greater than a certain distance away from AE, the reverberator can be disabled.

priority_type_3_present equal to 1 indicates the acoustic environment with neighbor_AE_id has acoustic coupling with the current AE having the id environmentsld in the reverb payload metadata structure.

A further example is shown as follows where the scene and reverberator parameters are mapped into digital reverberator parameters is described in the following bitstream definition. In this implementation embodiment, the acoustic environment enclosure geometry and acoustic coupling information is included in the reverb metadata.

| REVERB METADATA | bits | Mnemonic |
|---|---|---|
| reverbPayloadStruct( ){ | | |
| numberOfSpatialPositions; | 2 | Bslbf |
| for(int i=0;i<numberOfSpatialPositions;i++){ | | |
| azimuth; | 9 | Tcimsbf |
| elevation; | 9 | Tcimsbf |
| } | | |
| numberOfAcousticEnvironments; | 8 | uimsbf |
| for(int i=0;i<numberOfAcousticEnvironments;i++){ | | |
| environmentsId; | 16 | tcimsbf |
| filterParamsStruct( ); | | |
| hasAEEnclosureStruct; | 1 | uimsbf |
| if(hasAEEnclosureStruct){ | | |
| AEEnclosureStruct( ); | | |
| } | | |
| hasAcousticCouplingStruct; | 1 | uimsbf |
| if(hasAcousticCouplingStruct){ | | |
| AcousticCouplingsStruct( ); | | |
| } | | |
| PaddingBits; | 6 | uimsbf |
| for(int j=0;j<numberOfSpatialPositions;j++){ | | |
| delayLineLength; | 32 | uimsbf |
| filterParamsStruct( ); | | |
| } | | |

```
  aligned(8) AEEnclosureStruct( ){
  unsigned int(32) num_AE_EnclosureFaces;
  for(i=0;i<num_AE_EnclosureFaces;i++){
    AE_EnclosureFaceStruct( );
  }
}
  aligned(8) AE_EnclosureFaceStruct( ){
  unsigned int(8) num_vertices; //vertices for the enclosure face
    for(i=0;i<num_vertices;i++){
    PositionStruct( );
  }
}
  aligned(8) PositionStruct( ){
  signed int(32) vertex_pos_x;
  signed int(32) vertex_pos_y;
  signed int(32) vertex_pos_z;
}
```

| REVERB DISABLE METADATA | bits | Mnemonic |
|---|---|---|
| AcousticCouplingsStruct( ){ | | |
| num_AEs; | 3 | uimsbf |
| for(int i=0;i<num_AEs;i++){ | | |
| neighbor_AE_id; | 16 | tcimsbf |
| acoustic_coupling_present; | 1 | uimsbf |
| PaddingBits; | 7 | uimsbf |
| num_acoustic_coupling; | 8 | uimsbf |
| for(int i=0;i<num_acoustic_coupling; i++){ | | |
| AcousticCouplingVolume( ); | | |
| } | | |
| } | | |
| } | | |

```
  aligned(8) AcousticCouplingVolume( ){
  unsigned int(1) isPrimitive;
  if(!isPrimitive){
    unsigned int(32) num_AC_Faces;
    for(i=0;i<num_AC_Faces;i++){
      AC_FaceStruct( );
    }
  }
  if(isPrimitive)
    unsigned int(8) primitive_type;//types of primitives, box, sphere,
```

-continued

```
cylinder, etc.
  if(primitive_type == 1)
    SphereStruct( );
  if(primitive_type == 2)
    BoxStruct( );
  if(primitive_type == 3)
  CylinderStruct( );
}
```

```
aligned(8) AC_FaceStruct( ){
unsigned int(8) num_vertices; //vertices for the enclosure face
    for(i=0;i<num_vertices;i++){
    PositionStruct( );
  }
}
  aligned(8) PositionStruct( ){
  signed int(32) vertex_pos_x;
  signed int(32) vertex_po_y;
  signed int(32) vertex_pos_z;
}
```

The syntax semantics to describe the geometry elements related to reverb metadata and rendering are as follows:

Semantics of AEEnclosureStruct( ) and AcousticCouplingsStruct( )

AEEnclosureStruct( ) structure describes the bounds of the enclosure. This can used by the reverb to determine the containment of the listener as well as determine reverb parameters.

AcousticCouplingsStruct( ) structure describes the acoustic couplings between the different acoustic environments. This is specified from the perspective of each of the AEs. This ensures that a detailed overview of the audio scene geometry is provided to the renderer.

hasAEEnclosureStruct equal to 1 indicates the presence of AEEnclosureStruct( ) A value of 0 indicates the absence of this information in the reverb metadata.

Figure 19:
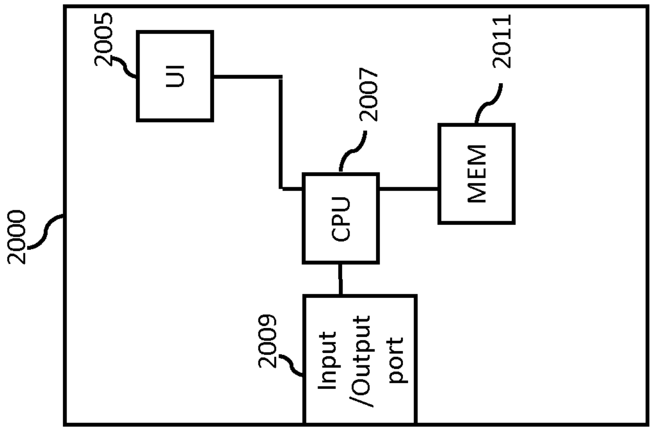
FIG. 19 shows an example device suitable for implementing the apparatus shown in previous figures.

With respect to FIG. 19 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc. The device may for example be configured to implement the encoder or the renderer or any functional block as described above.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 2000 may be employed as at least part of the renderer. The input/output port 2009 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for spatial rendering in at least two acoustic environments of 6DOF audio, the apparatus comprising:

at least one processor; and at least one memory storing instructions that, when executed with the at least one processor, cause the apparatus at least to:

obtain information associated with at least a number of reverberators based on an acoustic environment of the at least two acoustic environments;

determine, based on the information, a set of reverberators from the number of reverberators, the set of reverberators configured to be initialized;

generate at least one configuration parameter for at least one of the set of reverberators;

initialize the set of reverberators based on the at least one configuration parameter;

obtain at least one audio signal; and process the at least one audio signal with the initialized set of reverberators to generate late reverberation during rendering of the processed at least one audio signal based on the acoustic environment.

2. The apparatus as claimed in claim 1, wherein the instructions, when executed with the at least one processor, cause the apparatus to obtain the information at least partly based on a determination of an enclosure for at least one acoustic environment, wherein the at least one acoustic environment comprises at least one enclosure with a higher priority than a further acoustic environment without an enclosure.

3. The apparatus as claimed in claim 1, wherein the instructions, when executed with the at least one processor, cause the apparatus to compare the number of reverberators to a threshold number and select the set based on the threshold number, based on the set of reverberators with the highest priority.

4. The apparatus as claimed in claim 1, wherein the instructions, when executed with the at least one processor, cause the apparatus to obtain information at least partly based on a position of a user within the acoustic environment, with a reverberator corresponding to the acoustic environment enclosing the user receiving the highest priority and further reverberators associated with acoustic environments connected to the enclosing acoustic environment receiving second highest priority.

5. The apparatus as claimed in claim 4, wherein the instructions, when executed with the at least one processor, cause the apparatus to select in run-time, based on the position of the user, the set of reverberators from the number of reverberators.

6. The apparatus as claimed in claim 1, wherein the instructions, when executed with the at least one processor, cause the apparatus to associate a lower priority to a first reverberator associated with a first acoustic environment with a lower reverberation level than a second reverberator associated with a second acoustic environment with a higher reverberation level.

7. The apparatus as claimed in claim 1, wherein the instructions, when executed with the at least one processor, cause the apparatus to assign priority information based on a distance of a listener to the acoustic environment, with a first reverberator associated with a first acoustic environment having a larger distance to the listener having a smaller priority than a second reverberator associated with a second acoustic environment having a smaller distance to the listener.

8. The apparatus as claimed in claim 1, wherein the instructions, when executed with the at least one processor, cause the apparatus to receive from at least one further apparatus a bitstream comprising the information, wherein the information comprises content creator preferences.

9. The apparatus as claimed in claim 1, wherein the instructions, when executed with the at least one processor, cause the apparatus to obtain the information from a bitstream, wherein the information comprises an importance of at least one criteria when prioritizing the set of reverberators, wherein the at least one criteria comprises:

an enclosure existence;

a threshold number of reverberators;

a position of a listener in an acoustic enclosure;

a reverberation level; and a distance of the listener from the acoustic environment.

10. The apparatus as claimed in claim 1, wherein the instructions, when executed with the at least one processor, cause the apparatus to at least one of:

generate configuration parameter values for configuration parameters common for the set of reverberators, wherein the configuration parameter values are the same or different for the configuration parameters between reverberators of the set of reverberators;

generate configuration parameter values for different configuration parameters for the set of reverberators; or generate configuration parameter values for indicating whether one of the set of reverberators from the number of reverberators is to be initialized.

11. The apparatus as claimed in claim 1, wherein the set of reverberators is a sub-set of reverberators smaller than the number of reverberators.

12. A method for an apparatus for spatial rendering in at least two acoustic environments of 6DOF audio, the method comprising:

obtaining information associated with at least a number of reverberators based on an acoustic environment of the at least two acoustic environments;

determining, based on the information, a set of reverberators from the number of reverberators, the set of reverberators configured to be initialized;

generating at least one configuration parameter for at least one of the set of reverberators;

initializing the set of reverberators based on the at least one configuration parameter;

obtaining at least one audio signal; and processing the at least one audio signal with the initialized set of reverberators to generate late reverberation during rendering of the processed at least one audio signal based on the acoustic environment.

13. The method as claimed in claim 12, wherein obtaining information associated with at least the number of reverberators comprises determining information at least partly based on a determination of an enclosure for at least one acoustic environment, wherein the at least one acoustic environment comprises at least one enclosure with a higher priority than a further acoustic environment without an enclosure.

14. The method as claimed in claim 12, wherein determining, based on the information, the set of reverberators from the number of reverberators, the set of reverberators configured to be initialized, comprises comparing the number of reverberators to a threshold number and selecting the set based on the threshold number, based on the set of reverberators with the highest priority.

15. The method as claimed in claim 12, wherein obtaining the information comprises obtaining information at least partly based on a position of a user within the acoustic environment, with a reverberator corresponding to the acoustic environment enclosing the user receiving the highest priority and further reverberators associated with acoustic environments connected to the enclosing acoustic environment receiving second highest priority.

16. The method as claimed in claim 15, wherein determining, based on the information, the set of reverberators from the number of reverberators comprises selecting in run-time, based on the position of the user, the set of reverberators from the number of reverberators.

17. The method as claimed in claim 12, wherein determining, based on the information, the set of reverberators from the number of reverberators comprises associating a lower priority to a first reverberator associated with a first acoustic environment with a lower reverberation level than a second reverberator associated with a second acoustic environment with a higher reverberation level.

18. The method as claimed in claim 12, wherein determining, based on the information, the set of reverberators from the number of reverberators comprises assigning priority information based on a distance of a listener to the acoustic environment, with a first reverberator associated with a first acoustic environment having a larger distance to the listener having a smaller priority than a second reverberator associated with a second acoustic environment having a smaller distance to the listener.

19. The method as claimed in claim 12, wherein obtaining the information comprises receiving from at least one further apparatus a bitstream comprising the information, wherein the information comprises content creator preferences.

20. The method as claimed in claim 12, wherein obtaining the information comprises obtaining information from a bitstream, wherein the information comprises an importance of at least one criteria when prioritizing the set of reverberators, wherein the at least one criteria comprises:

an enclosure existence;

a threshold number of reverberators;

a position of a listener in an acoustic enclosure;

a reverberation level; and a distance of the listener from the acoustic environment.

* * * * *